United States Patent
Kutaragi et al.

(10) Patent No.: US 6,749,507 B2
(45) Date of Patent: Jun. 15, 2004

(54) ENTERTAINMENT APPARATUS AND MONITOR DEVICE USED THEREIN

(75) Inventors: Ken Kutaragi, Kanagawa (JP); Teiyu Goto, Saitama (JP); Mitsuyuki Tokusashi, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 106 days.

(21) Appl. No.: 09/877,959

(22) Filed: Jun. 8, 2001

(65) Prior Publication Data

US 2002/0068634 A1 Jun. 6, 2002

(30) Foreign Application Priority Data

| Jun. 8, 2000 | (JP) | 2000-171481 |
| Nov. 17, 2000 | (JP) | 2000-351418 |
| May 14, 2001 | (JP) | 2001-144005 |

(51) Int. Cl.⁷ .................. A63F 13/08; H04N 9/12
(52) U.S. Cl. .................. 463/31; 348/794; 348/839
(58) Field of Search .................. 463/31, 46; 348/790, 348/791, 838, 839, 794

(56) References Cited

U.S. PATENT DOCUMENTS

| 5,309,249 A | | 5/1994 | Ishii ................ 358/342 |
| 5,396,340 A | * | 3/1995 | Ishii et al. ................ 386/106 |
| 5,600,580 A | | 2/1997 | Honjo et al. ................ 364/708.1 |
| 5,665,000 A | * | 9/1997 | Burrell et al. ................ 463/46 |
| 5,796,576 A | | 8/1998 | Kim ................ 361/681 |
| 5,956,017 A | * | 9/1999 | Ishizawa et al. ................ 345/156 |
| 6,445,385 B1 | * | 9/2002 | Shin et al. ................ 345/204 |

FOREIGN PATENT DOCUMENTS

| EP | 0 886 203 A2 | 12/1998 | ........... G06F/1/16 |
| JP | 56-71673 | 6/1981 | |
| JP | 62245320 | 10/1987 | ........... G06F/1/00 |
| JP | 07203348 | 4/1995 | |
| JP | 2000189675 | 7/2000 | ........... A63F/3/00 |
| TW | 358379 | 5/1999 | |
| WO | WO 00/02417 | 1/2000 | |

OTHER PUBLICATIONS

Notification Action to Japanese Application No. 2000–008327; Date of Application Nov. 22, 2000, Title: Monitor Device for Entertainment System.
Notification Action to Japanese Application No. 2000–008328; Date of Application Nov. 22, 2000, Title: Monitor Device for Entertainment System.
Taiwanese Office Action of Mar. 29, 2002 for Taiwan Application No. 90114080, and Translation of Rejections citing Taiwanese Patent Document No. 358379.

* cited by examiner

*Primary Examiner*—Andrew M. Dolinar
(74) *Attorney, Agent, or Firm*—Frommer Lawrence & Haug LLP; William S. Frommer; Hans R. Mahr

(57) ABSTRACT

The present invention provides an entertainment apparatus that can serve to display images and to reproduce sound either by connecting to a television set or only by itself. It has an apparatus body (1) for generating and outputting sound and video signals and a monitor device (90) attached to the apparatus body for outputting sound and displaying images based on the sound and video signals outputted from the apparatus body. The apparatus body generates sound and video signals and outputs them via a signal output terminal. The monitor device (90) comprises a monitor portion (91) which includes a display device (911) for displaying an image and a sound device (912) for outputting sound, a fixing portion (95) for connecting and fixing the monitor portion to the casing, a signal input terminal for receiving a signal from the signal output terminal connected thereto when the monitor device is connected to the casing. The monitor portion (91) is rotatably connected to the fixing portion (95).

16 Claims, 32 Drawing Sheets

FIG.35A
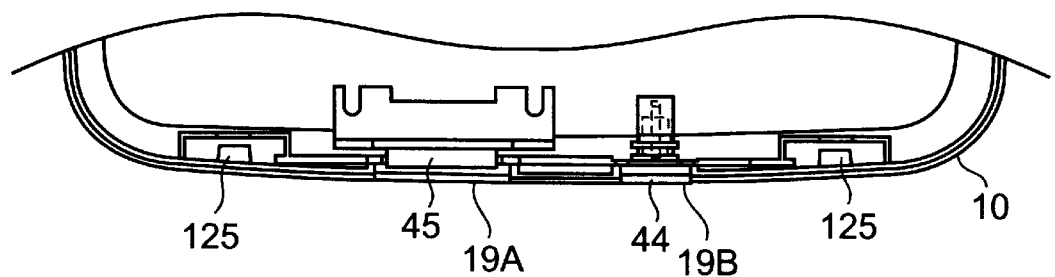
FIG.35B
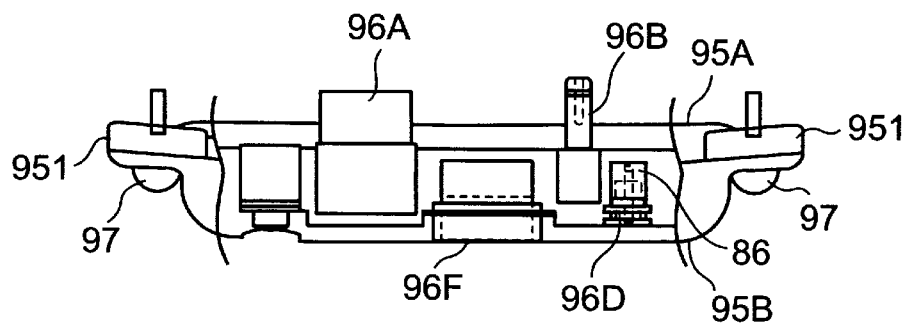
FIG.35C   FIG.35D   FIG.35E
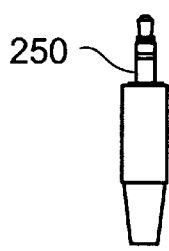 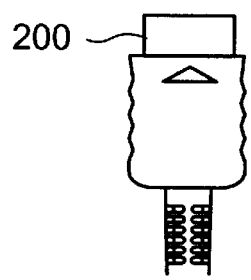 

ENTERTAINMENT APPARATUS AND
MONITOR DEVICE USED THEREIN

This application claims a priority based on Japanese Patent Applications No. 2000-171481, No. 2000-351418, and No. 2001-144005 filed on Jun. 8, 2000, Nov. 17, 2000, and May 14, 2001, respectively, the entire contents of which are incorporated herein by reference for all purposes.

FIELD OF THE INVENTION

The present invention generally relates to an entertainment apparatus for generating and outputting sound and video signals, more particularly, an entertainment apparatus and monitor device mountable thereon for generating and outputting such as sound signals and video signals by reading out information from a recording medium.

BACKGROUND OF THE INVENTION

An entertainment apparatus serves to play games and to reproduce music and images. One of this type of entertainment apparatuses, in the concrete, a game, CD or DVD player, reads out information from a record medium such as, for example, CD (Compact Disk), DVD (Digital Versatile Disk), CD-ROM (Compact Disk Read Only Memory) and DVD-ROM (DVD Read Only Memory), to generate and output sound and video signals.

Among the above, an entertainment apparatus reading out information from an optical disk comprises a disk device including an optical pick-up portion, a circuit board where a CPU (Central Processing Unit) and an image processing unit are mounted, and a casing for containing the above. In this type of entertainment apparatus, the image and/or sound information recorded on the optical disk are detected by the optical pick-up portion and then processed for calculating by the CPU or image processing unit to generate and output the image and/or sound signals. An external display device reproduces the image and/or sound information recorded on the optical disk by means of the image and/or sound signals.

Many of such entertainment apparatuses are usually arranged to be connected with a television set to be used as a display device. That is because most of users of such entertainment apparatus, especially domestic users, have the television set. Namely, using a television set as a display device allows removing of a particular display device, so that the compact and inexpensive apparatus can be provided.

This type of entertainment apparatus, however, is being increasingly used as a personal apparatus rather than a home apparatus as it becomes more popular. This would result in a desire to enjoy playing games and reproducing images and music without connecting to a television set. Further, when one person watches television on a television set originally, other person cannot play games on the same television set, so that there is a need to develop an entertainment apparatus which serves to play games and such without a television set.

DISCLOSURE OF THE INVENTION

An object of the present invention is to provide an entertainment apparatus that is able to display image and reproduce sound with and without a television set to be connected.

Another object of the present invention is to provide a monitor device for displaying images and reproducing sound in the entertainment apparatus.

To achieve the above objects, in a first embodiment according to the present invention, an entertainment apparatus for generating and outputting sound and video signals includes:

an apparatus body for generating and outputting sound and video signals; and a monitor device attached to the apparatus body for outputting sound and displaying images based on the sound and video signals outputted from the apparatus body, wherein the apparatus body is provided on its topside with a container portion for loading an optical disk and a lid portion capable of opening and closing for covering the container portion, and the monitor device either overlapping or located away from said lid potion is able to keep its display portion observable from the front of the apparatus body, and is at least rotatably attached to the apparatus body between the locations.

Further, to achieve another object of the present invention, in a second embodiment according to the invention, a monitor device connected to an apparatus body of an entertainment apparatus for displaying images by video signals outputted from the apparatus comprises:

a monitor potion having a display device for displaying images;

a fixing portion for connecting and fixing the monitor potion to the apparatus body; and a signal input terminal to be connected to a signal output terminal of the apparatus body when the monitor device is connected and fixed to the apparatus body for receiving signals from the signal output terminal, wherein the monitor portion and said fixing portion are rotatably connected each other.

BRIEF DESCRIPTION OF THE DRAWINGS

FIG. 35A is a partial cutaway view illustrating a connecting part of the apparatus body to the fixing portion of the monitor device.

FIG. 35B is a partial cutaway view illustrating a connecting part between of the fixing portion of the monitor device to the apparatus body.

FIG. 35C is a plan view illustrating one example of an image terminal.

FIG. 35D is a plan view illustrating one example of an external connector.

FIG. 35E is a plan view illustrating one example of a power supply plug.

BEST MODE OF THE INVENTION

Embodiments of the present invention will be described hereinafter, by referring to drawings. In the following embodiments, an entertainment apparatus serving to play games is exampled. The entertainment apparatus, of course, can serve to reproduce images and music other than to play games.

Figure 7:
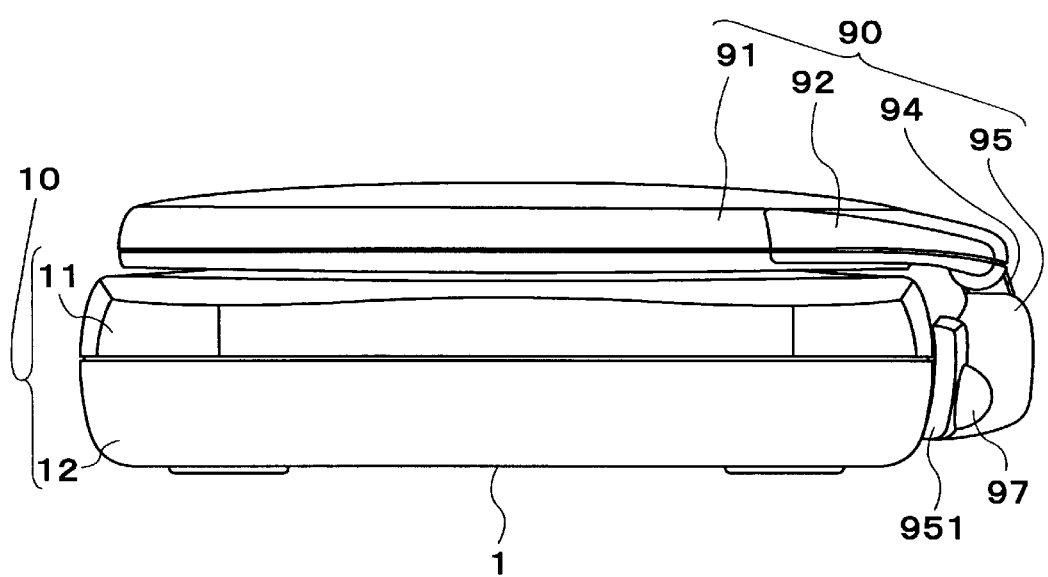
FIG. 7 is a side view of an entertainment apparatus according to the first embodiment of the present invention.
Figure 8:
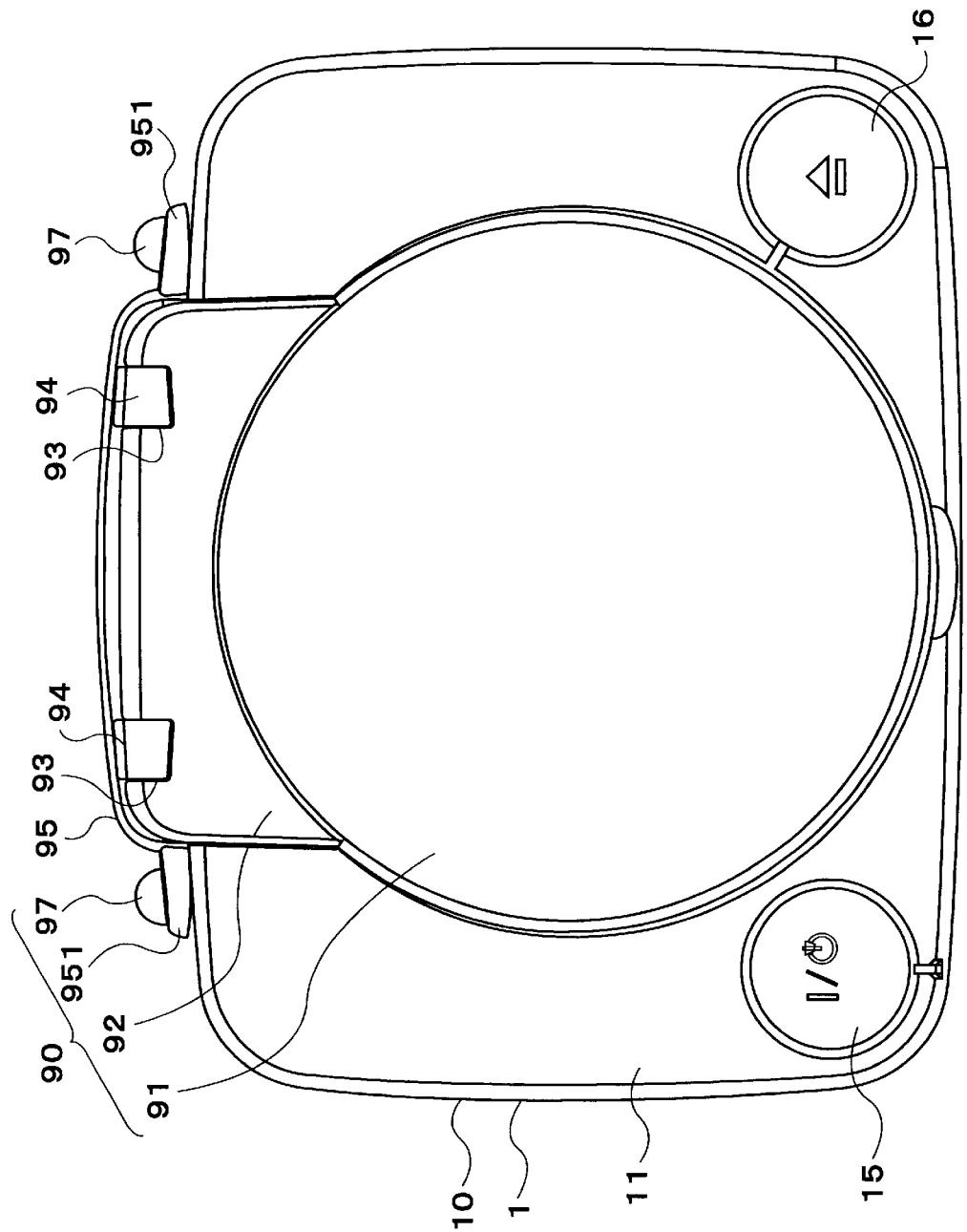
FIG. 8 is a plan view of an entertainment apparatus according to the first embodiment of the present invention.
Figure 9:
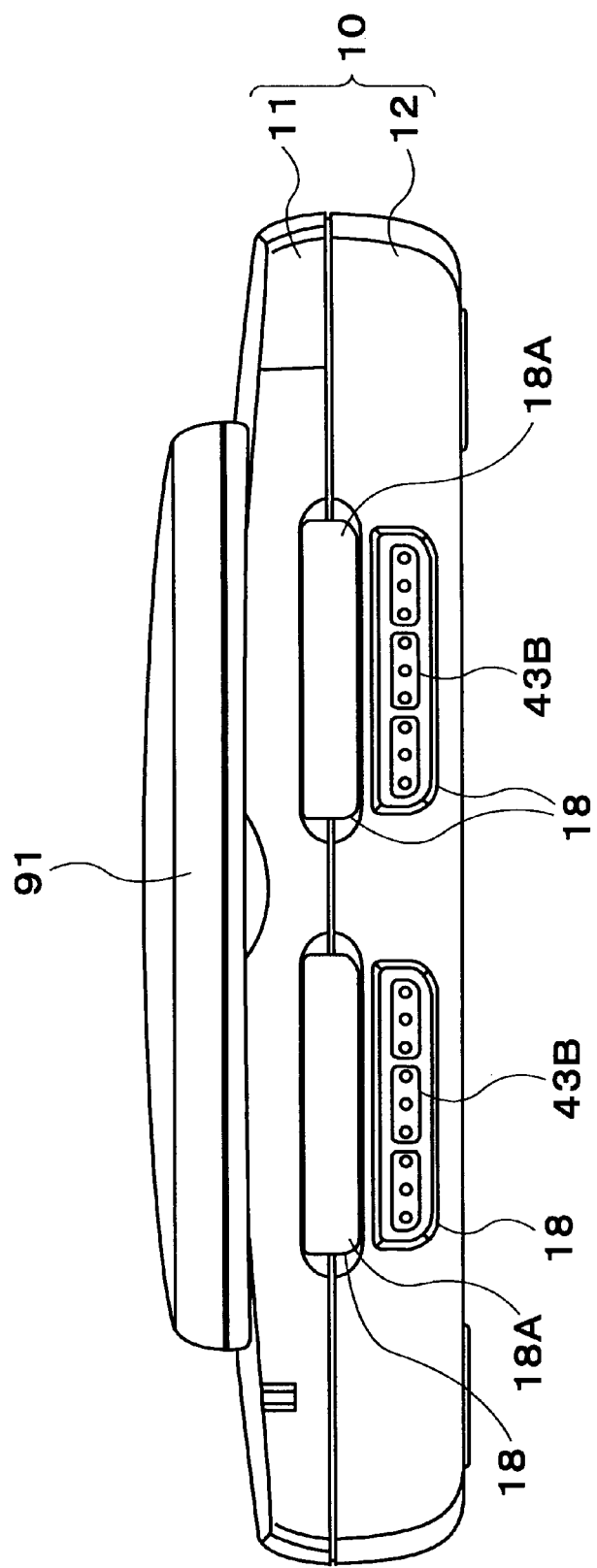
FIG. 9 is a front view of an entertainment apparatus according to the first embodiment of the present invention.

An entertainment apparatus according to a first embodiment of the present invention includes, as shown in FIG. 7, an apparatus body 1 for generating and outputting sound and video signals and a monitor device 90 connected to the apparatus body 1 for outputting sound and displaying images based on the sound and video signals outputted from the apparatus body 1. The monitor device 90 is detachably attached to the apparatus body 1. The monitor device 90 either overlapping or located away from a top surface of the apparatus body 1 is able to keep its display portion (display device) visible from the front of the apparatus body 1, and is at least rotatably attached to the apparatus body 1 between the above locations. Thus, the entertainment apparatus in this embodiment can serve to play games only with the apparatus body 1 after detaching the monitor device 90.

Figure 1:
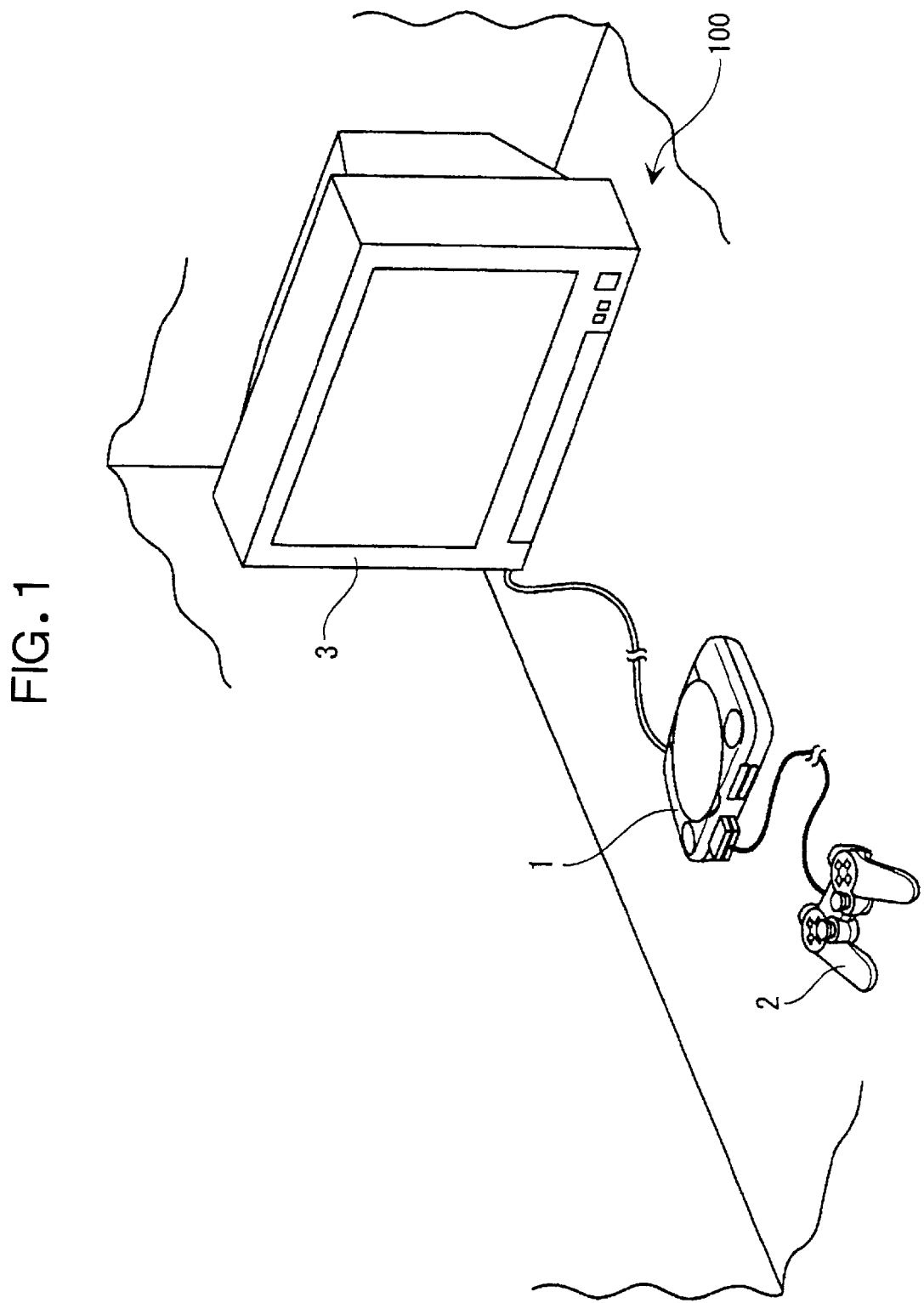
FIG. 1 is a schematic perspective view showing a condition of using an entertainment apparatus according to the present invention.

FIG. 1 shows a typical manner of using in a room 100 the entertainment apparatus of this embodiment only with the apparatus body 1. In the embodiment shown in FIG. 1, the apparatus body 1 is connected to a television set 3 outputting images and sound and to a controller 2 that is an operation apparatus for transmitting instruction to the entertainment apparatus 1. The apparatus body 1 is arranged to be supplied with direct current electric power by an AC adapter not shown. DC plug from the AC adapter is connected to the rear of the apparatus body 1 in FIG. 1.

When the entertainment apparatus is used as a game apparatus, it reads, for example, a game program recorded on an optical disk and executes the program in accordance with an instruction from the controller 2 operated by a user (game player). The entertainment apparatus controls the game proceeding, image display, and sound output in playing the game.

The apparatus body 1 of the entertainment apparatus comprises, as shown in FIGS. 2 to 6, an optical disk device 60, a circuit board 40 for generating signals by processing information, and a casing 10 for containing them. The optical disk apparatus 60 is disposed on the upper side of the casing 10 and the circuit board 40 is disposed on the lower side of the casing 10. The optical disk device 60 and the circuit board 40 constitute a signal generating portion for reading information recorded on a recording medium (a CD 4 in an example shown in FIG. 3) loaded in the optical disk device 60 to generate and output sound and video signals.

The casing 10 formed of, for example, ABS resin, comprises an upper case 11 and a lower case 12 for containing the apparatus body, and is formed in the shape of plane square.

Figure 3:
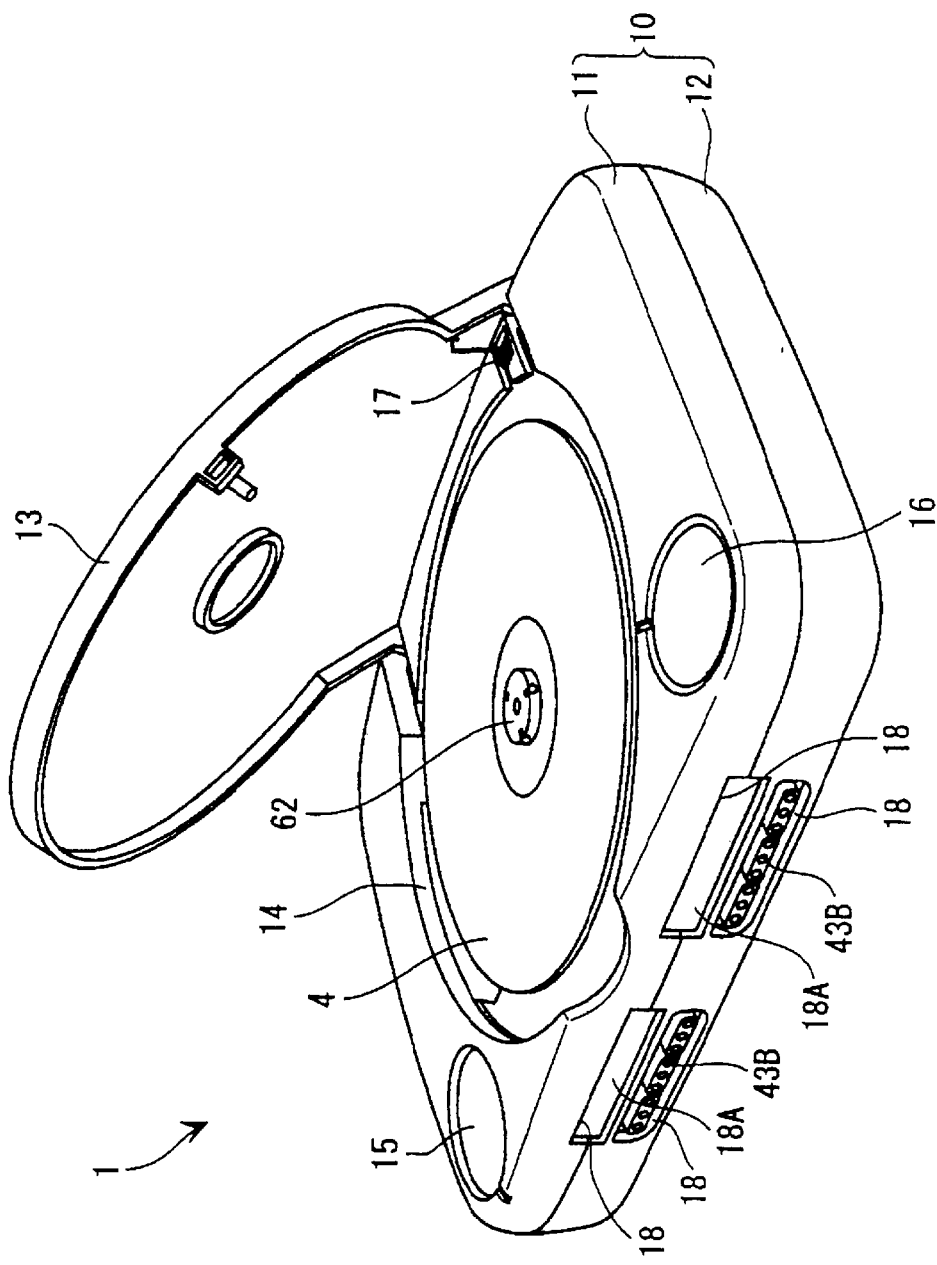
FIG. 3 is a perspective view of the apparatus body with its lid open.

The upper case 11 covers the internal part of the apparatus from the upper side, and is provided at the center thereof with a lid portion 13, which is in the shape of plane rough circle. The lid portion 13 is provided with a recording medium contain portion 14 in its internal part (FIG. 3).

There is a power supply button 15, which is operated for turning the apparatus on and off, provided on the left side of the lid portion 13 in the top surface of the upper case 11. On the right side of the lid portion 13 in the top surface of the upper case 11, provided an open-close button 16 having a built-in click member not shown, which goes forth and back relative to the lid portion 13 for opening and closing the lid portion 13.

The lid portion 13 is attached to the upper case 11 so that its end is freely rotatable. As shown in FIG. 3, a coil spring 17 encircling a rotation axis of the lid portion 13 is provided between the bottom of the lid portion 13 and the upper case 11. It is arranged that the lid portion 13 opens and closes by means of the urge of the coil spring 17.

Figure 2:
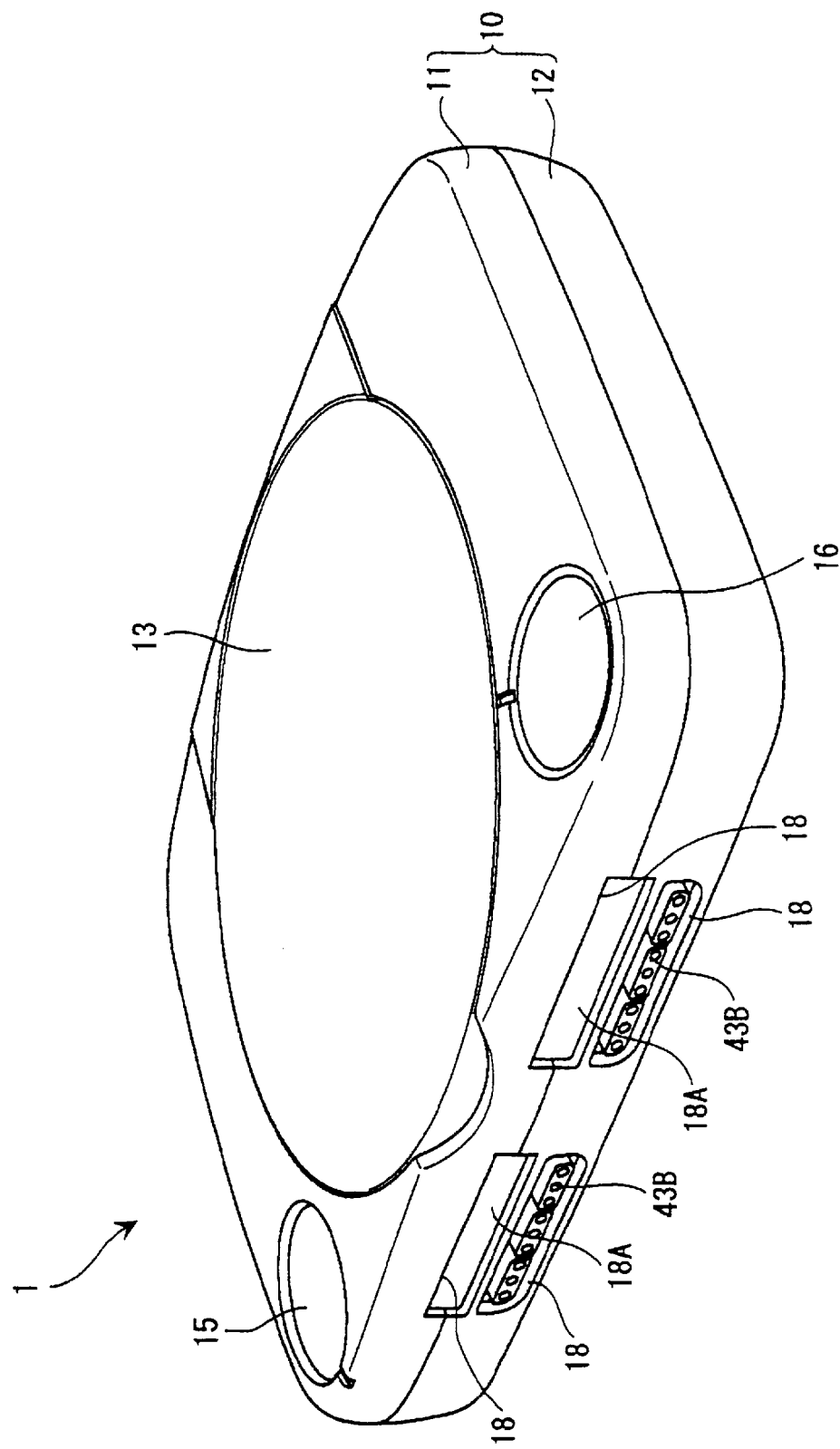
FIG. 2 is a schematic perspective view of an apparatus body of the entertainment apparatus according to the present invention.

Concretely, in FIG. 2, pushing of the open-close button 16 releases the interlock of the built-in click member with the lid portion 13, so that the lid portion 13 opens by means of the urge of the coil spring 17 to expose the recording medium contain portion 14. In the recording medium contain portion 14, a chacking member 62 for holding an optical disk 4 such as, for example, a CD as a recording medium is provided. Loading the optical disk 4 in the chacking member 62, closing the lid portion 13, and then pushing the power supply button 15 cause the apparatus body 1 to be turned on and the contents recorded on the optical disk 4 can be reproduced.

On the front side of the casing 10 in FIG. 2, four openings 18 are formed. Two of the openings 18, which are disposed at the upper side, are provided with memory card connecting portions 43A mounted on the circuit board 40 constituting the apparatus body. The other two of the openings 18, which are disposed at the lower side, are provided with controller connecting portions 43B mounted on the circuit board 40 as well. The former openings 18 for disposing the memory card connecting portions 43A are covered with shutters 18A. Inserting the tip of a memory card opens the shutter 18A so that the memory card can be connected to the memory card connecting portion 43A.

Figure 6:
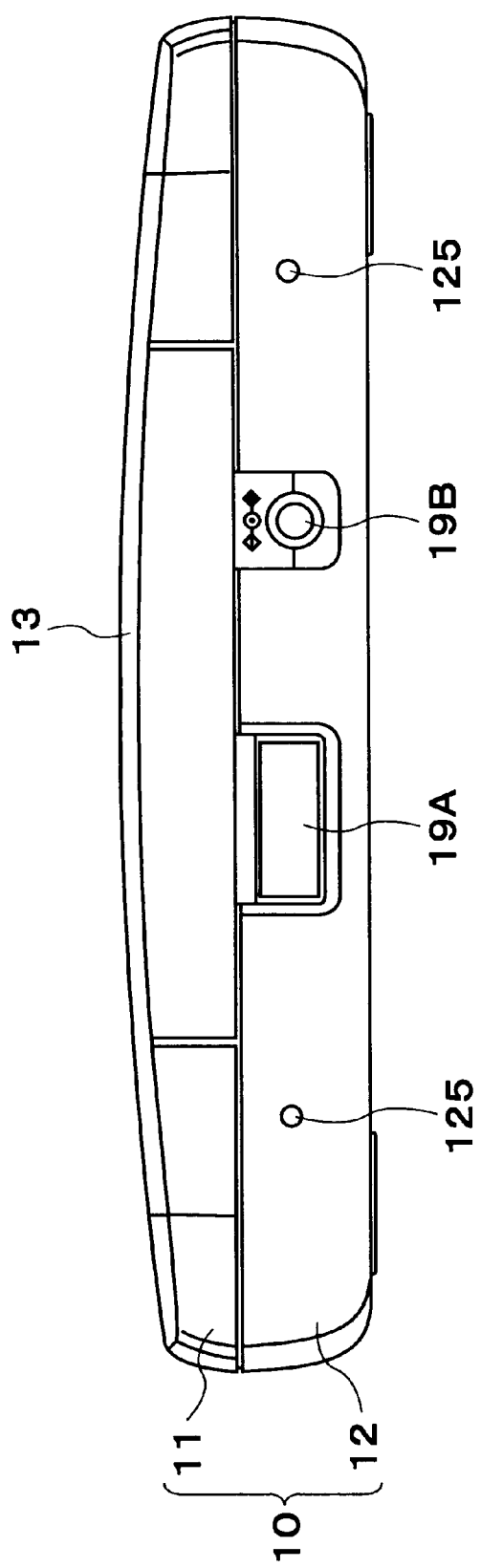
FIG. 6 is a rear view of the apparatus body.

On the rear side of the casing 10, that is, the opposite side surface to that of openings 18, are formed an opening 19A, as shown in FIG. 6, in which a signal output terminal is exposed, for outputting to a television set 3 various signals such as video signals and sound signals recorded on the recording medium such as an optical disk, and an opening 19B in which a power supply connector for supplying power to the apparatus body from the external power supply is exposed. Provided on the rear side of the casing 10, are also two screw holes 125 for connecting the monitor device 90 to the casing 10. FIG. 7 shows the monitor device 90 connected to the casing 10.

Figure 4:
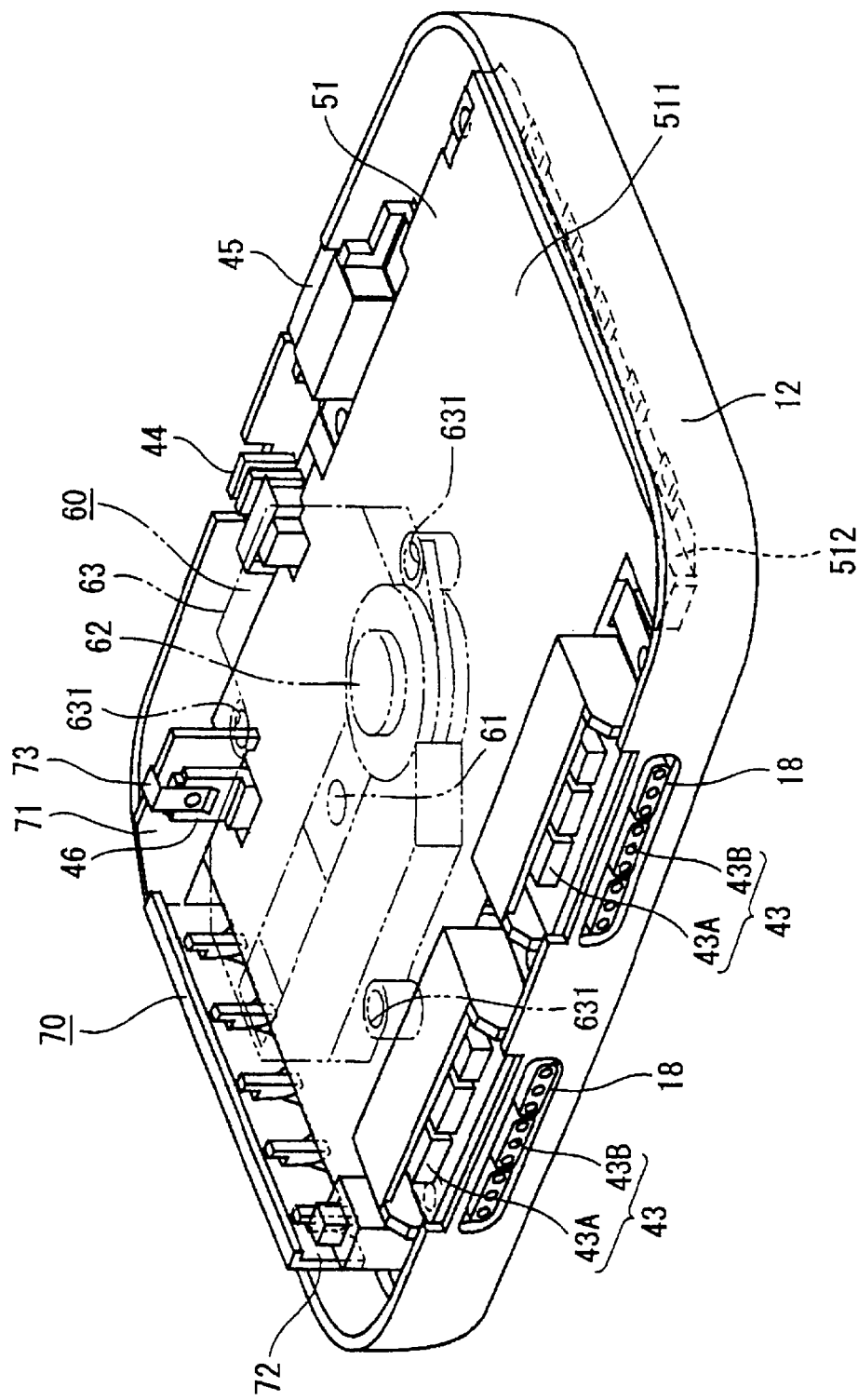
FIG. 4 is a perspective view of the apparatus body schematically showing its internal arrangement.
Figure 5:
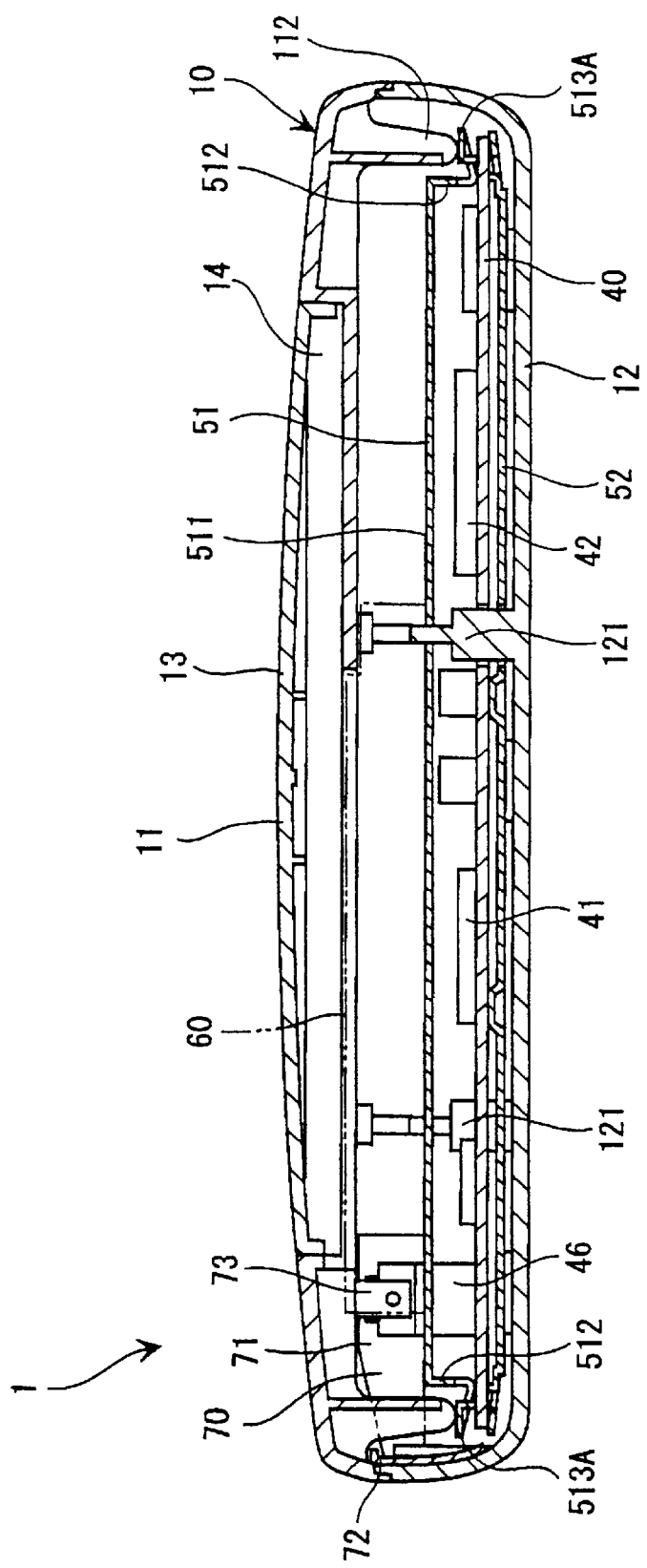
FIG. 5 is a vertical sectional view of the apparatus body.

The signal generating portion contained in the casing 10 comprises, as shown in FIGS. 4 and 5, the circuit board 40 for controlling the apparatus body 1, metal shield plates 51, 52 which vertically sandwich the circuit board 40 from top and bottom, the disk device 60 including the optical pick-up portion 61 disposed on and in contact with the top surface of the shield plate 51, and an aluminum heat sink 70 as a radiator of a three-terminal type of regulator 46.

On the circuit board 40, there are mounted not only various circuit elements including a CPU 41, which is a computer processing unit, and an image processing unit 42, but also a connecting unit 43 formed by integrating the memory card connecting portions 43A and the controller connecting portions 43B, a power supply connector 44, and video-sound output terminal 45 used as a signal output terminal.

The circuit board 40 also has a power supplying wiring pattern formed thereon for supplying the CPU 41 with electric power via the power supply connector 44. On the power supplying wiring pattern, is mounted a three-terminal type of regulator 46, for stabilizing the supply voltage.

Further, an earth pattern not shown is formed on the periphery of such circuit board 40 for earth potential. This earth pattern is also formed on the periphery of the back surface of the circuit board 40.

A plurality of inserting holes for inserting fix screws therethrough are formed on the front and rear ends of the circuit board 40 where the earth pattern is formed (omitted in Figures).

The shield plate 51 covers the circuit element mounted surface of the circuit board 40. The shield plate 51 comprises a plane plate portion 511 to be in contact with the disk device 60 and rib portions 512 provided on the periphery of the plane plate portion 511. The plane plate portion 511 and the rib portions 512 shield the three lateral sides and the upper side of the CPU 41 and the image processing unit 42 so that the microwaves from the circuit elements 41, 42 would not leak out of the apparatus. As shown in FIGS. 4 and 5, the plane plate portion 511 and the rib portions 512 are formed so that the connecting units 43 are externally exposed in combining the circuit board 40 with the shield plate 51. Thus, it is taken into account that the microwaves generated from CPU 41 and the like would not interfere the memory card connecting portions 43A and the controller connection portions 43B as noise.

The disk device 60 comprises the optical pick-up portion 61, the chacking member 62, and a case 63, inside of which a motor for rotating the chacking member 62 and a motor for sliding the optical pick-up portion 61 are contained. This disk device 60 is electrically connected to the circuit board 40 via a cable, and the recorded contents of the optical disk 4 detected by the optical pick-up portion 61 are sent to the CPU 41 on the circuit board 40 as electric signals.

The bottom surface of the lower case 12 containing the above mentioned circuit board 40, shield plates 51, 52, and disk device 60 has three projections 121 arranged in a standing condition at a rough center thereof and the inserting holes for inserting the fix screws as fix members, and the internal side surface of the lower case 12 has a plurality of projections 123 formed thereon.

The three projections 121, which are vertically provided at the rough center in order to sustain the load of the disk device 60, passes through the shield plates 51, 52 and the circuit board 40 to hold the bottom surface of the disk device 60. Accordingly, the disk device 60 to be directly in contact with the shield plate 51 is in fact sustained by the projections 121. Three engaging holes 631 for engaging with the projections 121 are formed on the periphery of the case 63. A buffer is disposed between the projection 121 and the engaging hole 631, although it is not shown in Figures, so as to absorb vibration that acts on the entertainment apparatus 1, thereby controlling the vibration of the disk device 60.

On the internal peripheral surface of the upper case 11, are formed projections corresponding to the locations of the inserting holes of the lower case 12 (omitted in Figures), as well as a plate rib 112 projectingly are formed according to the location of the earth pattern of the circuit board 40, as hold-down members.

The plate rib 112 is a hold-down member, with its top end being in contact with the piece 513A of the shield plate 51, for holding down the circuit board 40 and shield plates 51, 52 from their external surface side toward the lower case 12 and is formed on the side end of the circuit board 40 corresponding to the location of the earth pattern. On the internal side surface of the upper case 11 near the bottom part of the plate rib 112, is formed a latticed reinforcement rib, which is not shown, enclosing the plate rib 112, since some power is acted on the plate rib 112 when the upper case 11 is combined with the lower case 12 containing the circuit board 40, the shield plates 51, 52, and the disk device 60.

Further, metal shield plates not shown are provided on the internal peripheral surface of the upper case 11 in correspondence with the openings 18 of the memory card connecting portions 43A. The metal shield plates are arranged to cover the top, side and rear surfaces of the connecting units 43, so as to minimize the influence of noise on the input signals from the controller 2 and the output signals to the memory card.

These shield plates are screwed on the internal side surface of the upper case 11 to function as shutter hold means for holding the shutters 18A against the upper case 11, the shutters 18A shielding the openings 18 of the memory card connection portions 43A.

The heat sink 70 is connected to the three-terminal type of regulator 46 and comprises a connecting portion 71 extending to the internal side surface of the lower case 12 and a body radiator portion 72 extending along the internal side surface of the lower case 12 from one end of the connection portion 71 for radiating heat from the three-terminal type of regulator 46. A clip 73 holds the three-terminal type of regulator 46 and the connection potion 71. Due to the contact of the surfaces held by the clip 73, the heat from the three-terminal type of regulator 46 is quickly radiated through the connecting portion 71 from the body radiator portion 72.

Figure 10:
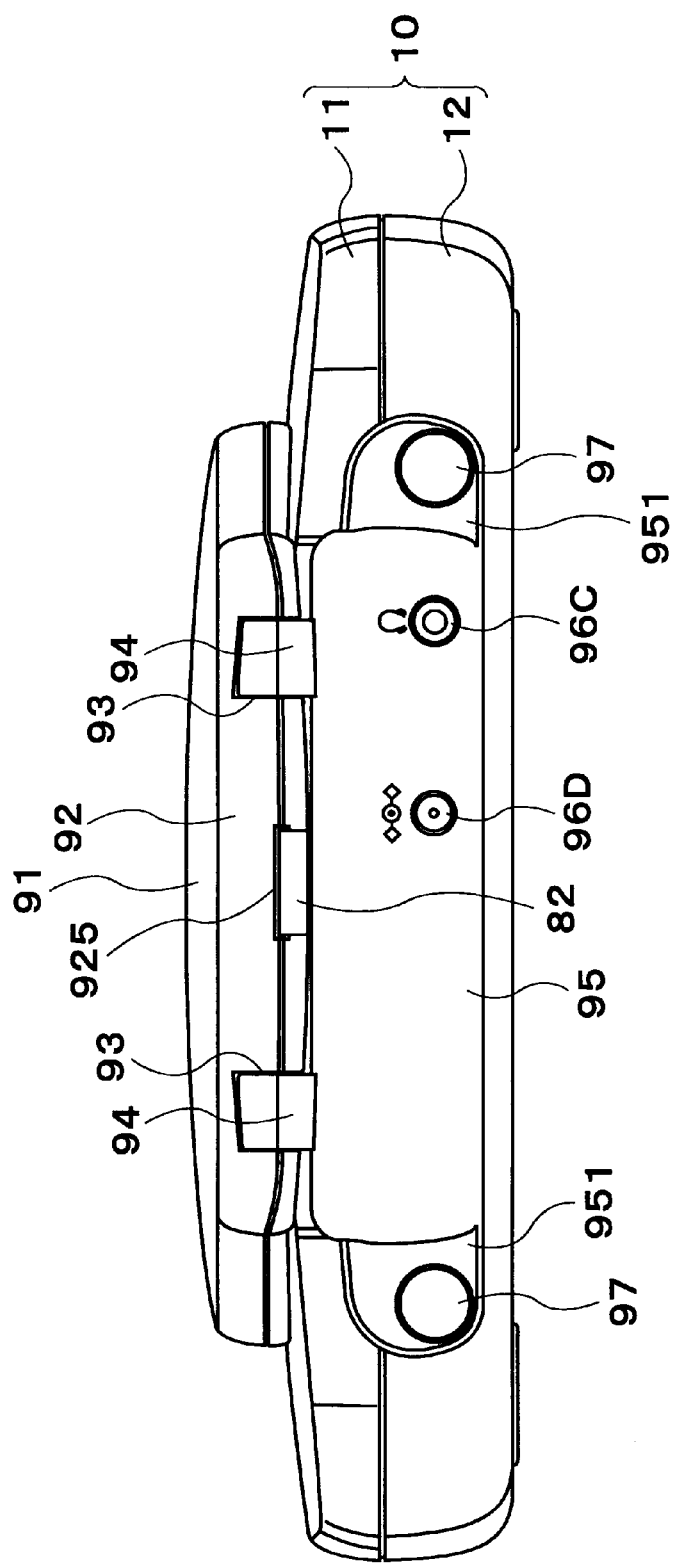
FIG. 10 is a rear view of an entertainment apparatus according to the first embodiment of the present invention.
Figure 11:
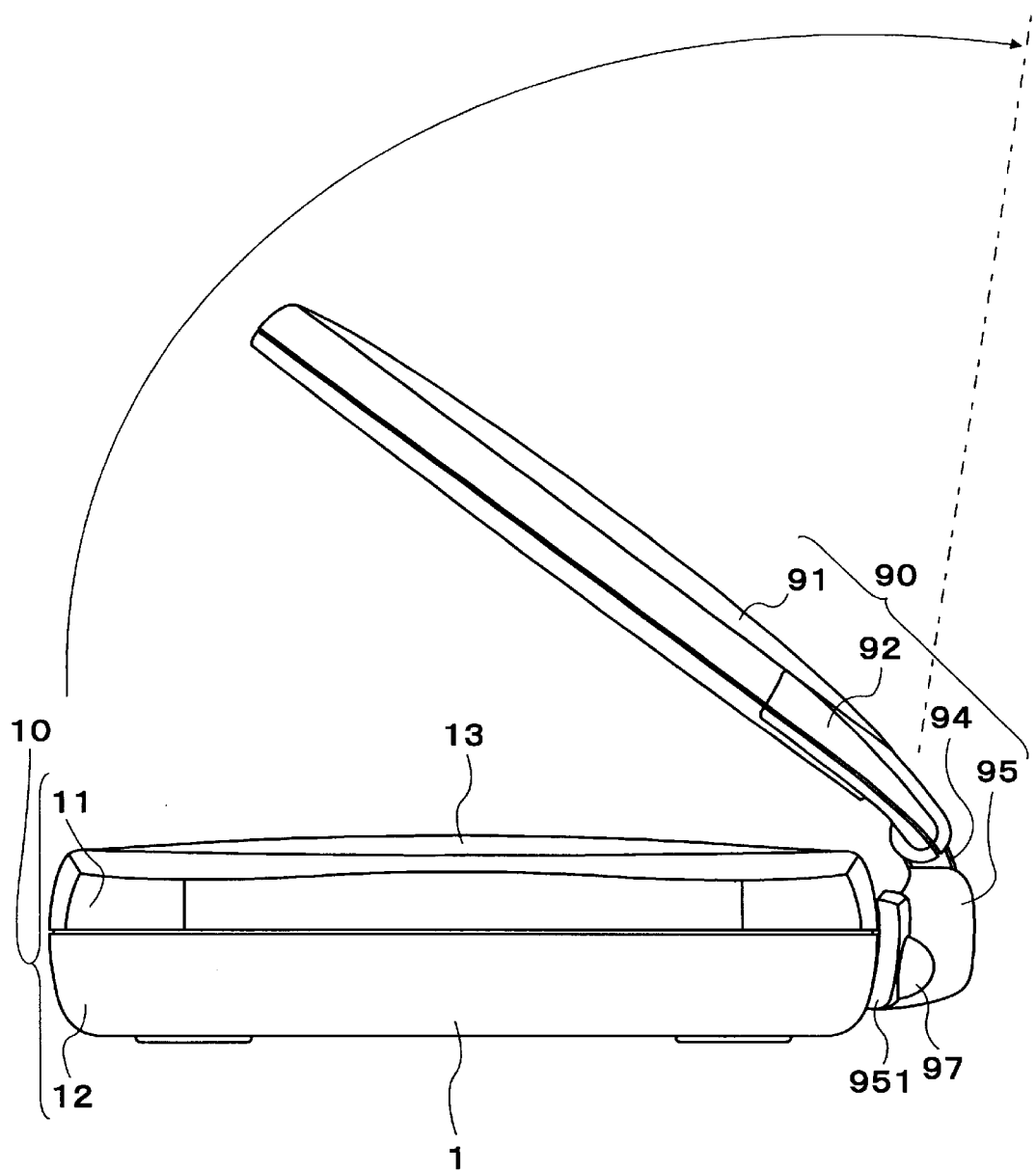
FIG. 11 is a side view of an entertainment apparatus with its monitor device on the way to be gotten up according to the first embodiment of the present invention.
Figure 12:
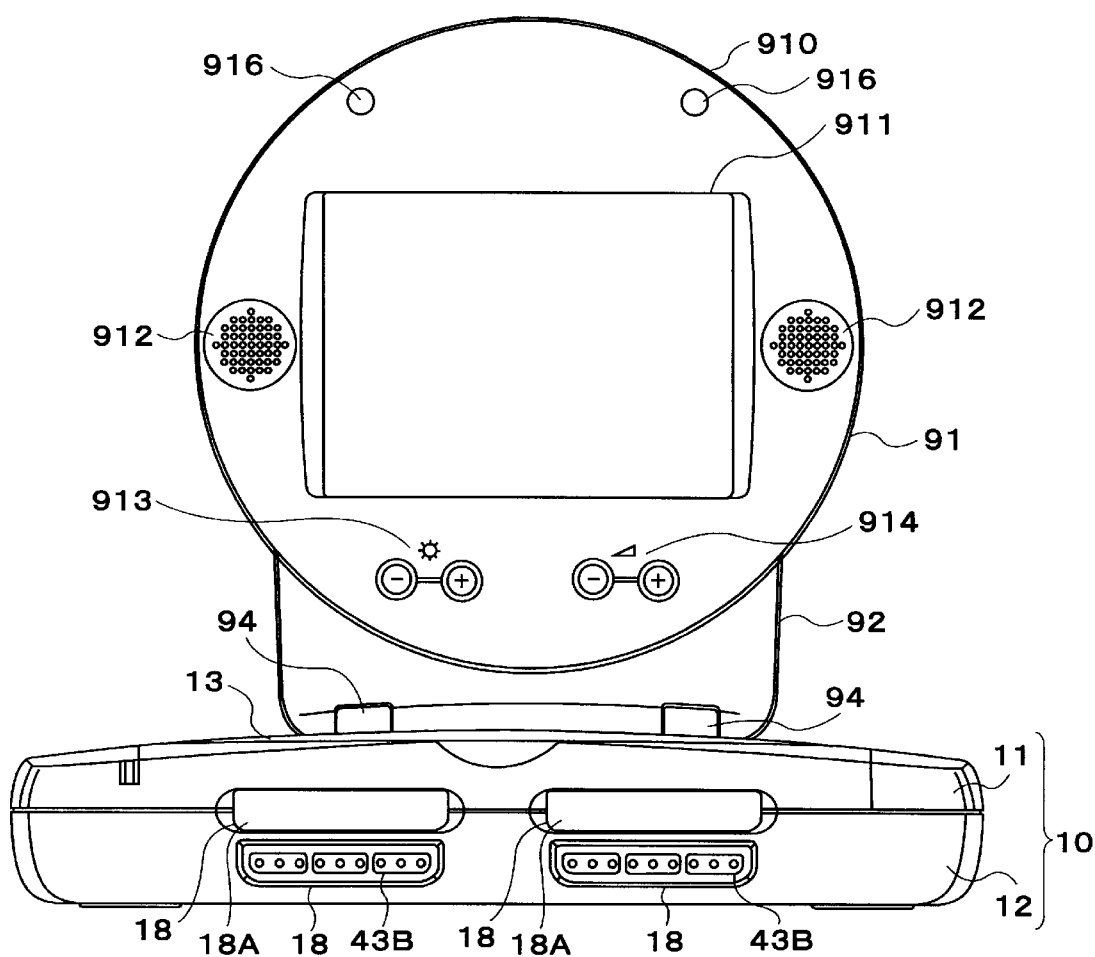
FIG. 12 is a front view of an entertainment apparatus with its monitor device gotten up according to the first embodiment of the present invention.
Figure 13:
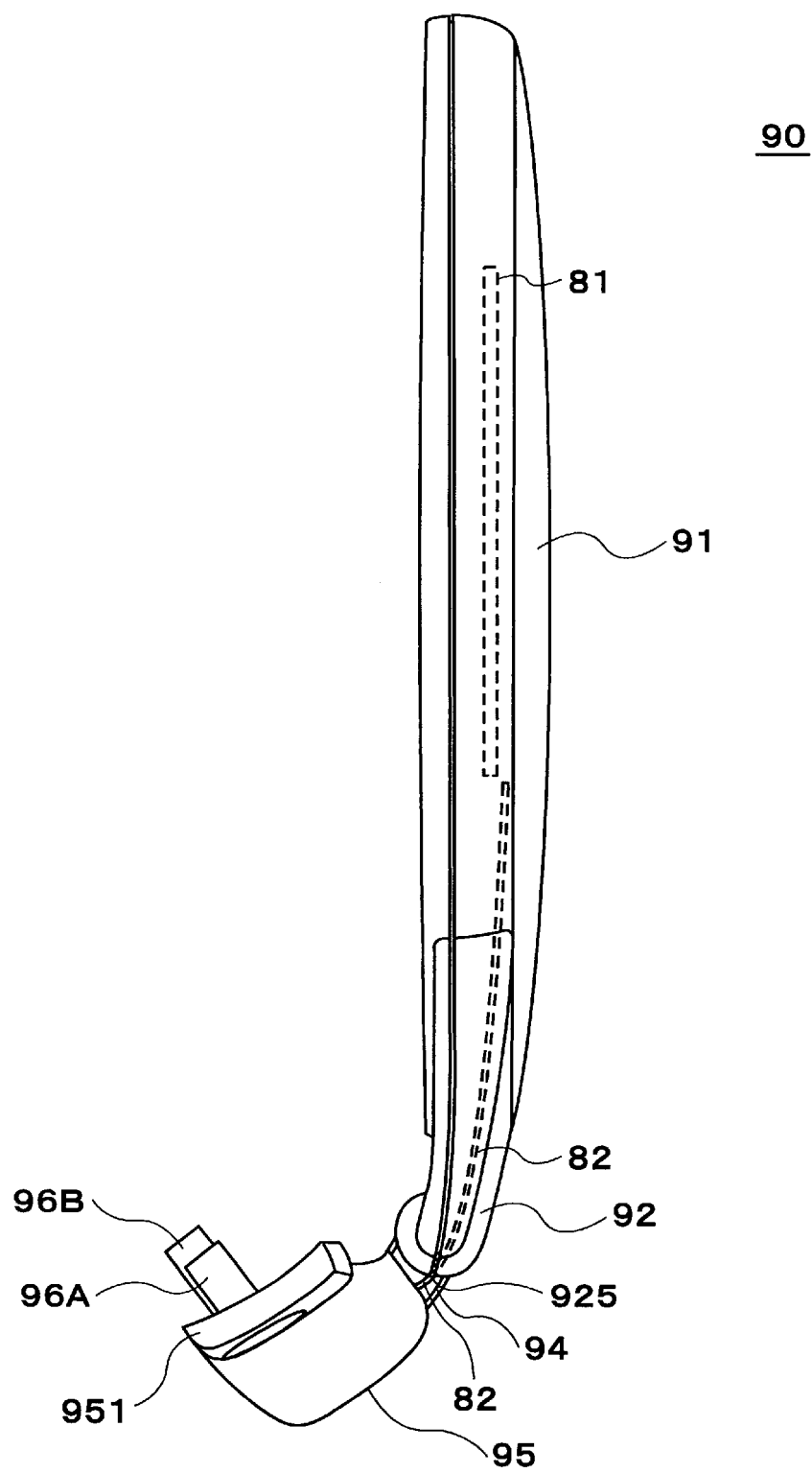
FIG. 13 is a side view of a monitor device used in an entertainment apparatus according to the first embodiment of the present invention.

The aforementioned monitor device 90 has, as shown in FIGS. 7 to 13, a monitor portion 91 for displaying images and outputting sound, a fixing portion 95 for connecting and fixing the monitor portion 91 to the casing 10 detachably. The monitor portion 91 and the fixing portion 95 are rotatably connected as shown in FIG. 11. The rotation range is arranged so that the monitor portion 91 can open and close from, for example, the position where the monitor portion 91 overlaps the lid portion 13 of the apparatus body 1 to the position where the monitor portion 91 makes an obtuse angle with the apparatus body 1 after passing its upright position. The monitor portion 91 may be arranged to stop at the upright position. FIGS. 7 to 12 show the monitor portion being connected to the casing 10 of the apparatus body 1. FIG. 13 shows the monitor device 90 being detached from the apparatus body, 1.

The monitor device 90 has an AC adapter 5 (see FIG. 22A) to be attached. The AC adapter 5 rectifies, by plugging a socket 5A into an outlet, commercial electric current thereby to generate direct current and outputs the direct current through a power supply plug 6. The AC adapter 5 and the power supply plug 6 are connected via a cable 7.

Figure 14:
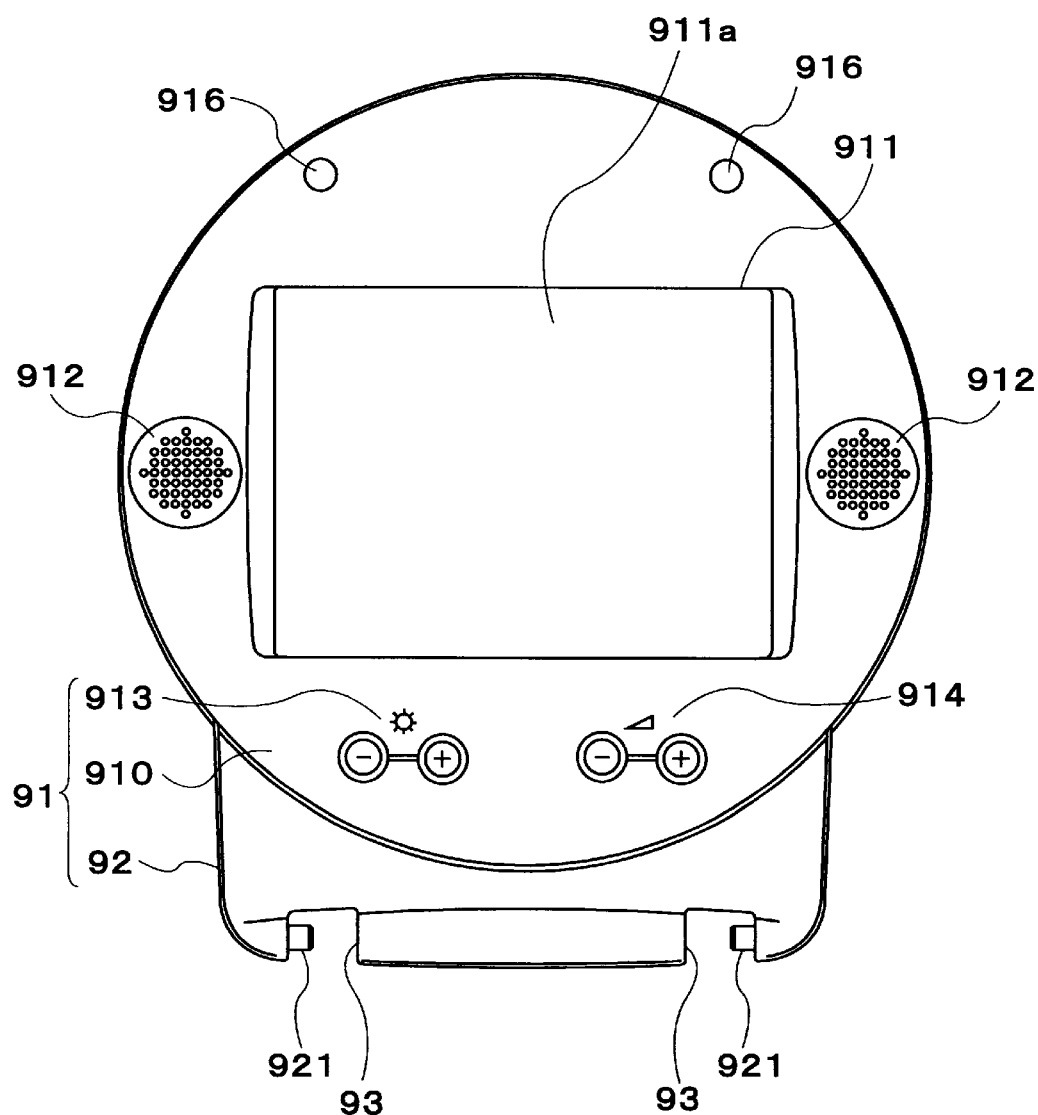
FIG. 14 is a bottom view showing an arrangement of the monitor portion constituting the monitor device according to the first embodiment of the present invention.

As shown in FIGS. 12 to 18, the monitor portion 91 comprises a panel portion 910 for image-displaying and sound-outputting and a base portion 92 for connecting and fixing the panel portion 910 to the fixing portion 95. On the panel portion 910, as shown in FIGS. 12 and 14, are disposed a displaying device 911 for displaying images, a sound device 912 for outputting sound, a display device luminance adjusting operation portion 913, a volume adjusting operation portion 914, and a stopper 916. According to the present embodiment, the panel portion 910 has a shape of a disk. The reason for that is the panel portion is almost identical in shape with the lid portion 13, on which the panel portion overlaps, of the apparatus body 1. This has an advantage that the appearance design could be easily accepted when the monitor device is attached later. The monitor portion 91, of course, can be formed in the shape other than the disk, for example, in the shape of tetragon or hexagon.

Figure 18:
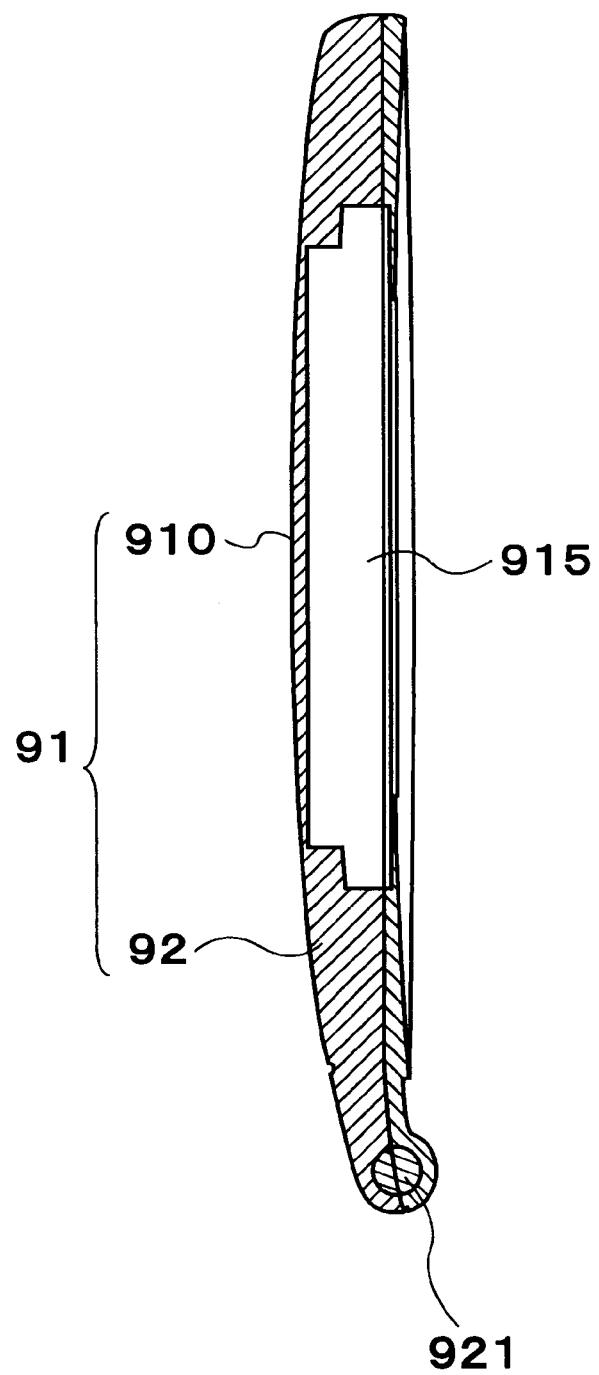
FIG. 18 is a sectional view showing an arrangement of the monitor portion constituting the monitor device.

The display device 911 has a substrate 81 (refer to FIG. 13) on which, for example, a liquid crystal display device not shown and its drive circuit (not shown) are mounted. The application is not limited to the liquid crystal display device, of course. The display device 911 is accommodated in an inner space 915 of the panel portion 910 as shown in FIG. 18. A display surface 911a of the display device 911 is provided on the surface facing to the top surface of the lid portion 13 of the apparatus body 1 when the monitor portion 91 overlaps the lid portion 13. Thus, the display surface 911a is faced toward the front side when the monitor portion 91 is raised against the apparatus body 1 as shown in FIG. 12. The liquid crystal display device can be, but not limited to, a TFT color liquid crystal device, for example. In this embodiment, the inner space 915 of the panel portion 910 has a backlight for illuminating the liquid crystal display device. To reduce the power consumed, a reflection liquid crystal display device may be used.

In this embodiment, the sound device 912 has right and left speakers respectively for right and left channels to attain the stereophonic effect. A circuit for driving the speakers, which is not shown, is disposed in the aforementioned inner space 915 of the panel portion 910.

There are two stoppers 916 provided on the outer place of the display device 911 of the panel portion 910. The stoppers 916 are formed of an elastic member such as a rubber member. The stoppers 916 are intended to make a space between the display surface 911a and the lid portion 13 so as not to be in contact with each other when the monitor portion 91 overlaps the lid portion 13 of the apparatus body 1.

Figure 15:
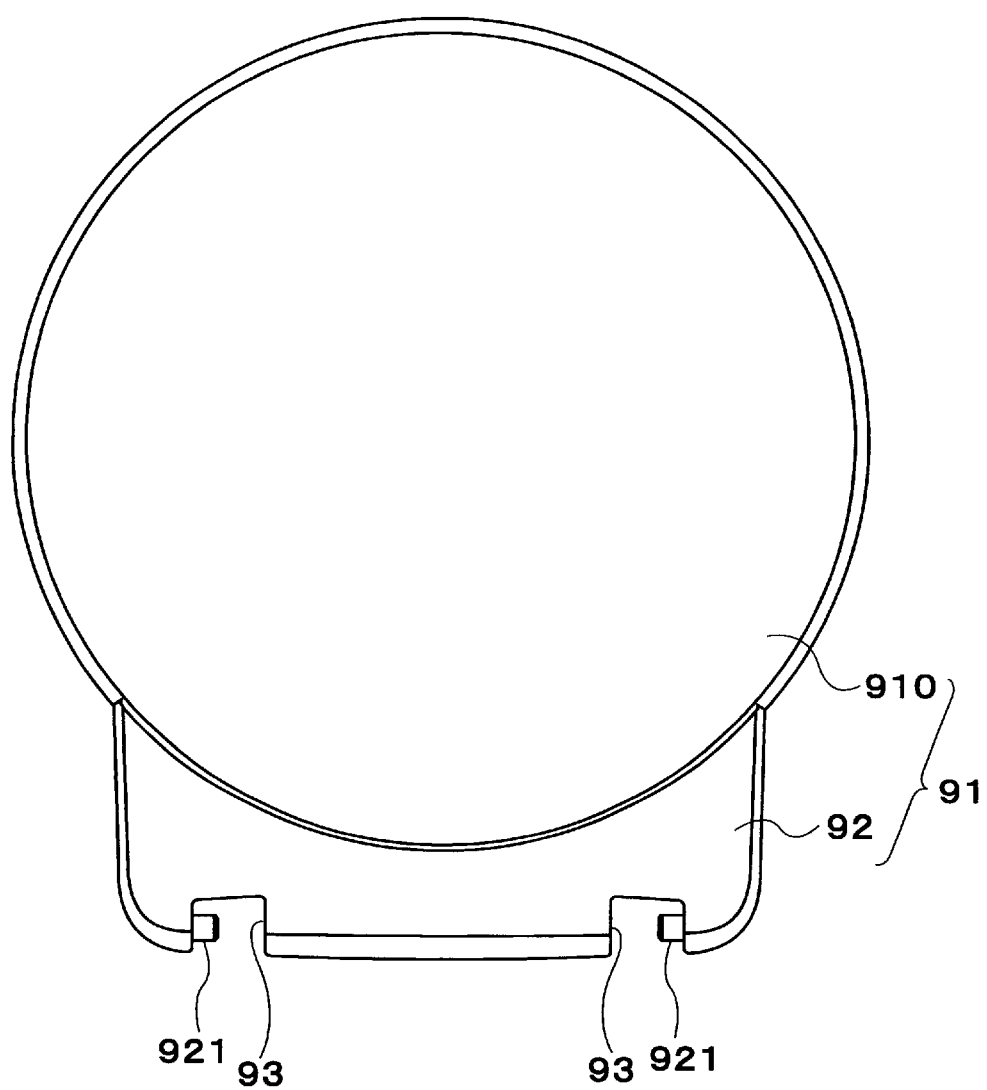
FIG. 15 is a top view showing an arrangement of the monitor portion constituting the monitor device.
Figure 16:
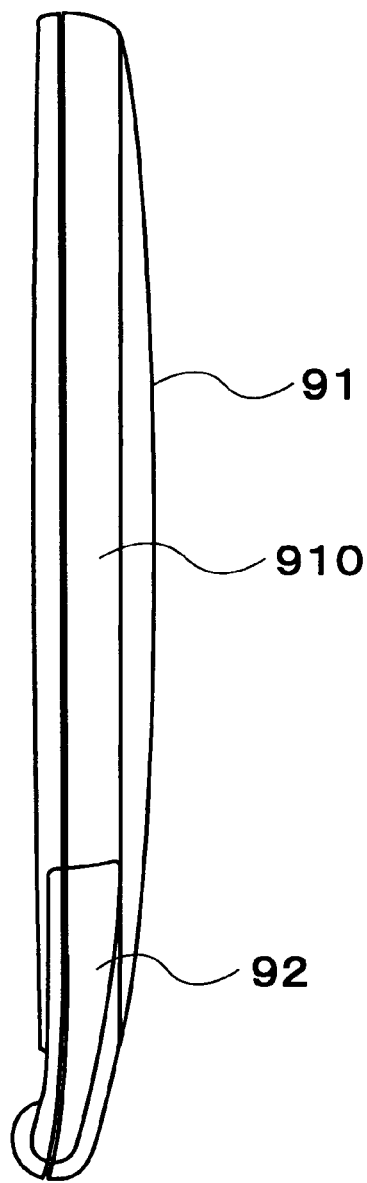
FIG. 16 is a side view showing an arrangement of the monitor portion constituting the monitor device.
Figure 17:
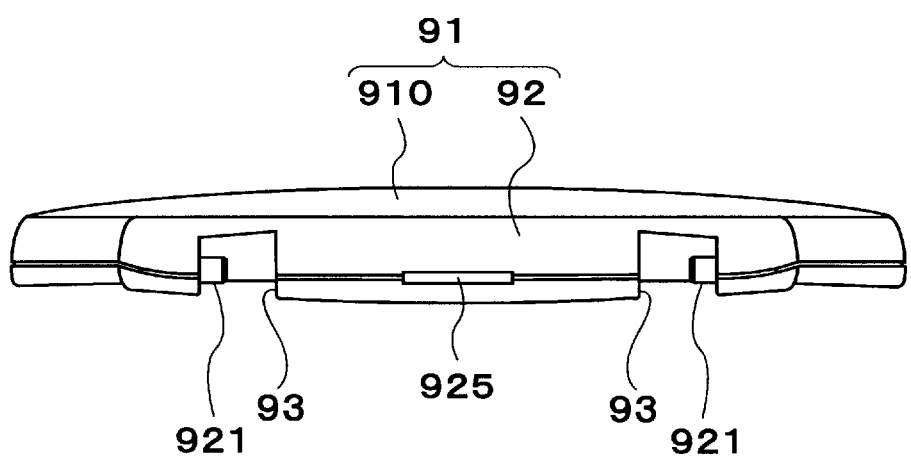
FIG. 17 is a rear view showing an arrangement of the monitor portion constituting the monitor device.

In this embodiment, the base portion 92 is integrally provided with the panel portion 910. As shown in FIGS. 14, 15 and 17, at the basal end of the base portion 92, two notches 93 are provided. Spindles 921 forming hinges respectively are provided in the notches 93 such that top ends of both spindles face each other. Elastic members not shown bias the spindles 921 so that the spindles 921 can expand and contract axially.

The fixing portion 95 is connected to the aforementioned monitor portion 91 and attached to the rear surface of the casing 10 of the apparatus body 1 (for example, refer to FIGS. 7, 10, 11, 13 and 19 to 22B). The fixing portion 95 has functions of supplying power to the monitor portion 91 and sending image and sound signals to the monitor portion 91 other than that of fixing the monitor portion 91 to the casing 10 as described above.

Figure 22A:
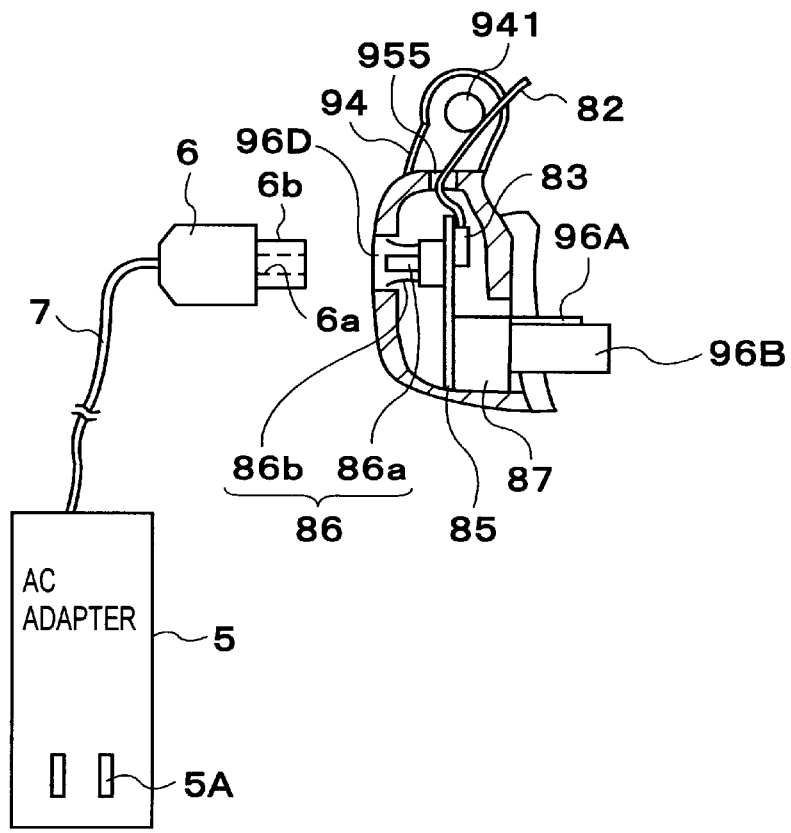
FIG. 22A is a sectional view showing an arrangement of the fixing portion constituting the monitor device.
Figure 22B:
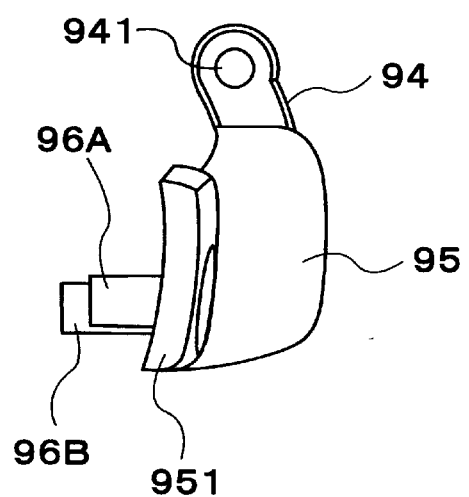
FIG. 22B is a side view showing an arrangement of the fixing portion constituting the monitor device.

Power supply and transmission of video and sound signals are carried out by a lead wire, for example, more concretely, by a flat cable 82. The flat cable 82 is connected to a substrate 85 via a connector 83 on the side of the fixing portion 95 as shown in FIG. 22A. Two of signal lines included in the flat cable are connected to a power supply plug jack 86 on the substrate 85 to be used for supplying direct current power. The other signal lines of the flat cable 82 are used to transmit the image and sound signals. Further, two of them are returned back through the volume adjusting operation portion 914 provided on the monitor portion 91, so as to be connected to a headphone jack (which may be referred to as "earphone jack") 96C (refer to FIG. 20). It may be also arranged that connection priority be given to the headphone, when the headphone plug is inserted into the headphone jack, thereby to turn off reproduction by the sound device 912.

The aforementioned power supply plug jack 86, voltage adjusting circuit 87 and the like are provided on the substrate 85. The power supply plug jack 86 has a pin 86a to be connected to an inner conductor 6a of the supply plug 6 and a pressure segment 86b to be connected to the outer conductor 6b of the supply plug 6. The pin 86a and the pressure segment 86b are connected on the substrate 85 to the signal lines for the power supply of the flat cable 82 and to the voltage adjusting circuit 87. The voltage adjusting circuit is a circuit for lowering the voltage in order to adapt the output voltage of the AC adapter 5 to operation voltage of the apparatus body 1, since the AC adapter 5 is assumed for voltage for driving liquid crystal display. The voltage adjusting circuit 87 can be omitted when the voltage of the apparatus body 1 is same as that of driving liquid crystal display. The substrate 85 may be replaced by wiring.

Figure 19:
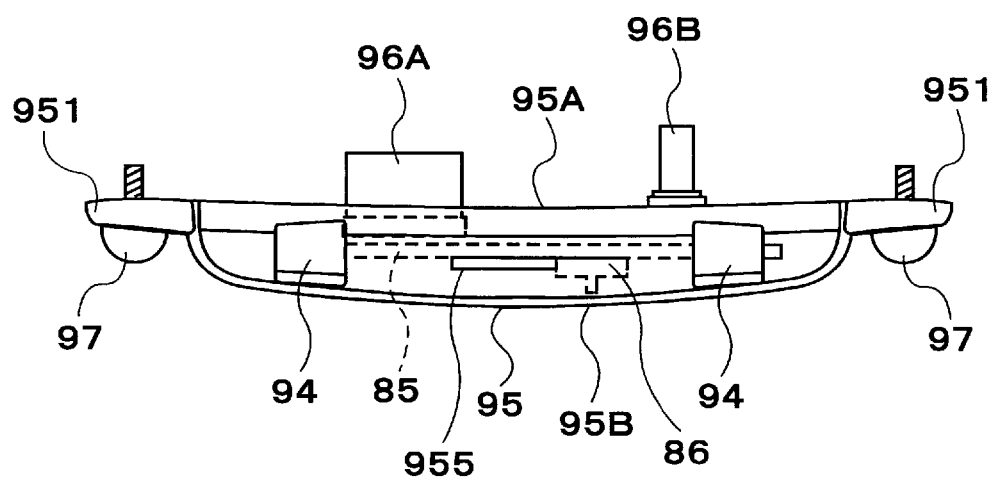
FIG. 19 is a top view showing an arrangement of the fixing portion constituting the monitor device.

A slit 955 is provided in the fixing portion 95 for passing the flat cable 82 therethrough as shown in FIGS. 19 and 22A. A slit 925 is also provided in the corresponding portion of the monitor portion 91 as shown in FIG. 17. The flat cable is not shown in FIGS. 17 and 19. The flat cable 82 passes through the slits 955 and 925, as shown in FIG. 22A, to electrically connect the fixing portion 95 with the monitor portion 91. Preferably, the flat cable 82 has flexibility since an angle between the monitor portion 95 and the fixing portion 91 is relatively changed. The flat cable has a length enough to accommodate arcuate movement of the monitor portion 91. Namely, it is arranged such that when the monitor device 90 is laid on the apparatus body 1, the flat cable 82 extending from the slit 925 of the monitor portion 91 is inserted between the monitor 91 and the base portion 95 as shown in FIG. 10, and then, led from the slit 955 shown in FIG. 19 into the fixing portion 95.

The fixing portion 95 has bearings 94 at the top end thereof for holding the aforementioned spindles 921. These bearings 94 are as wide as they can be inserted into the notches 93 of the monitor portion 91 (refer to FIG. 10, for example). The bearings 94 have through-holes 941 provided for passing the aforementioned spindles 921 therethrough (refer to FIGS. 22A and 22B).

The monitor portion 91 is connected to the fixing portion 95 by fitting the bearings 94 of the fixing portion 95 into the notches 93 with the spindles 921 pressed before inserting the spindles 921 into the through-holes 941 of the bearings 94. The spindles 921 are thus held rotatably by the bearings 94. In this embodiment, an appropriate frictional power is given to the spindles 921 in the hinge constituted by the spindles 921 and the bearings 94, which is not shown, so that the monitor portion 91 can be held at its desired angle. The manner of the connection between the monitor portion 91 and the fixing portion 95 is not limited to the above.

Flanges 951 are provided at the both ends of the fixing portion 95 (refer to FIGS. 10, 13 and 19 to 22B). The flanges have through-holes 952 provided for inserting bolts 97 (refer to FIG. 21). The fixing portion 95 is fixed to the casing 10 by inserting the bolts 97 into the through-holes 952 and screwing the tips of the inserted bolts 97 on the screw holes 125 of the casing 10.

Figure 21:
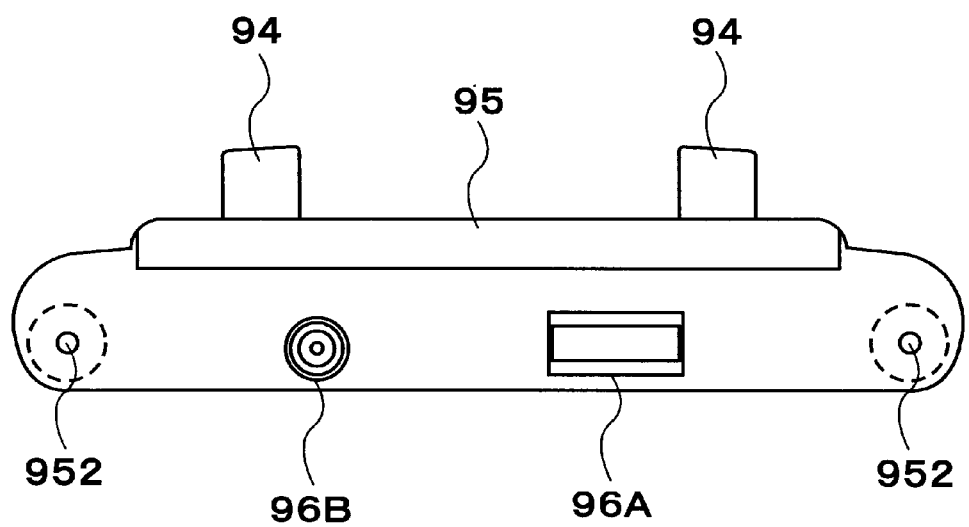
FIG. 21 is a front view showing an arrangement of the fixing portion constituting the monitor device.

An video-sound input terminal 96A, which is used as a signal input terminal, and a power supply connector 96B are disposed on the surface 95A of the fixing portion 95, which faces to the casing (refer to FIGS. 19 and 21). The image-sound input terminal 96A is fitted into the opening 19A of the apparatus body 1 and connected with the video-sound output terminal 45 in fixing the fixing portion 95 to the casing 10. The power supply connector 96B is fitted into the opening 19B of the apparatus body 1 and connected with the power supply connector 44 as well. Accordingly, after receiving the image-sound signals outputted from the apparatus body 1, the image and sound can be displayed on and outputted to the monitor portion 91. Further, a common power supply can drive the monitor portion 91 and the apparatus body 1. It may be also arranged that the monitor portion 91 can be driven by the different power supply from that of the apparatus body 1.

Figure 20:
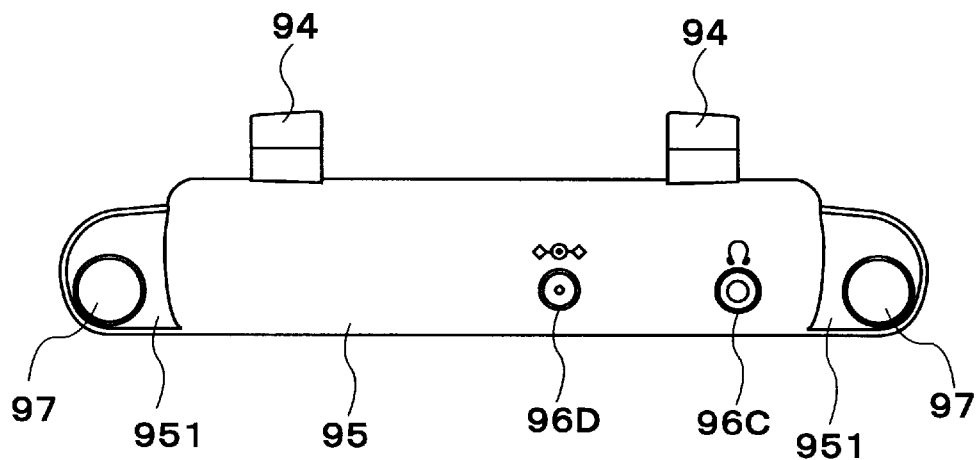
FIG. 20 is a rear view showing an arrangement of the fixing portion constituting the monitor device.

On the surface 95B of the fixing portion 95, which does not face to the casing, disposed are a headphone jack 96C and a power supply connector 96D as shown in FIGS. 10 and 20. The headphone jack 96C is supplied via a wiring not shown with sound signals branched through an inner circuit 98 from the aforementioned image-sound input terminal 96A (refer to FIG. 19). Thus, connecting the headphone plug to the headphone jack 95C allows a user to enjoy listening to the sound by means of the headphone. The connector 96D, as well as the connector provided on the apparatus body 1, can be connected to the corresponding power supply connector and supplied with power from outside. The power supply connector 96D is, as shown in FIG. 22A, connected to the power supply connector 96B, which leads to the apparatus body 1, via the voltage adjusting circuit 87, and also connected to the monitor portion 91, for supplying power.

Next, will be described a second embodiment of the present invention. An apparatus body for this embodiment may be the same as one in the first embodiment. In other words, the present embodiment is different in the configuration of a monitor device from the first embodiment. Accordingly, hereinafter, similar configuration parts are referred as the same reference number, and difference therebetween will mainly be described, The aforementioned monitor device 90 has, as shown in FIGS. 23 to 27, a monitor portion 91 for displaying images and outputting sound, a fixing portion 95 for connecting and fixing the monitor portion 91 to the casing 10 detachably, as shown in FIGS. 7 to 13. The monitor portion 91 and the fixing portion 95 are rotatably connected as shown in FIG. 11. The rotation range is arranged so that the monitor portion 91 can open and close from, for example, the position where the monitor portion 91 overlaps the lid portion 13 of the apparatus body 1 to the position where the monitor portion 91 makes an obtuse angle with the apparatus body 1 after passing its upright position. For example, the rotation range may be up to 180°. The monitor portion 91 may be arranged to stop at upright position. FIGS. 23 to 27 show the monitor portion 91 is connected to the casing 10 of the apparatus body 1. FIGS. 28 to 34 show the monitor device 90 being detached from the apparatus body 1.

Further, the monitor device 90 has an AC adapter 5 to be attached thereto (in FIG. 22A). The AC adapter 5 rectifies, by plugging a socket 5A into an outlet, commercial electric current thereby to generate direct current and to output the direct current through a power supply plug 6. The AC adapter 5 and the power supply plug 6 are connected via a cable 7.

As shown in FIGS. 27 to 35, the monitor portion 91 comprises a panel portion 910 for image-displaying and sound-outputting sound and a base portion 92 for connecting and fixing the panel portion 910 to the fixing portion 95. On the panel portion 910, as shown in FIGS. 12 and 14, disposed are a displaying device 911 for displaying images, a sound device 912 for outputting sound, a display device luminance adjusting operation portion 913, and a volume adjusting operation portion 914. According to the present embodiment, the panel portion 910 covers not only the lid portion 13 but also almost all the top surface of the apparatus body 1. The reason for that is, as mentioned below, obtaining a wider area of display device 911. Then, four corners of the panel portion 910 are curved. This is for design consideration. This has an advantage that the appearance design could be easily accepted even when the monitor device is attached later. This part, of course, may be formed in other shape.

Figure 27:
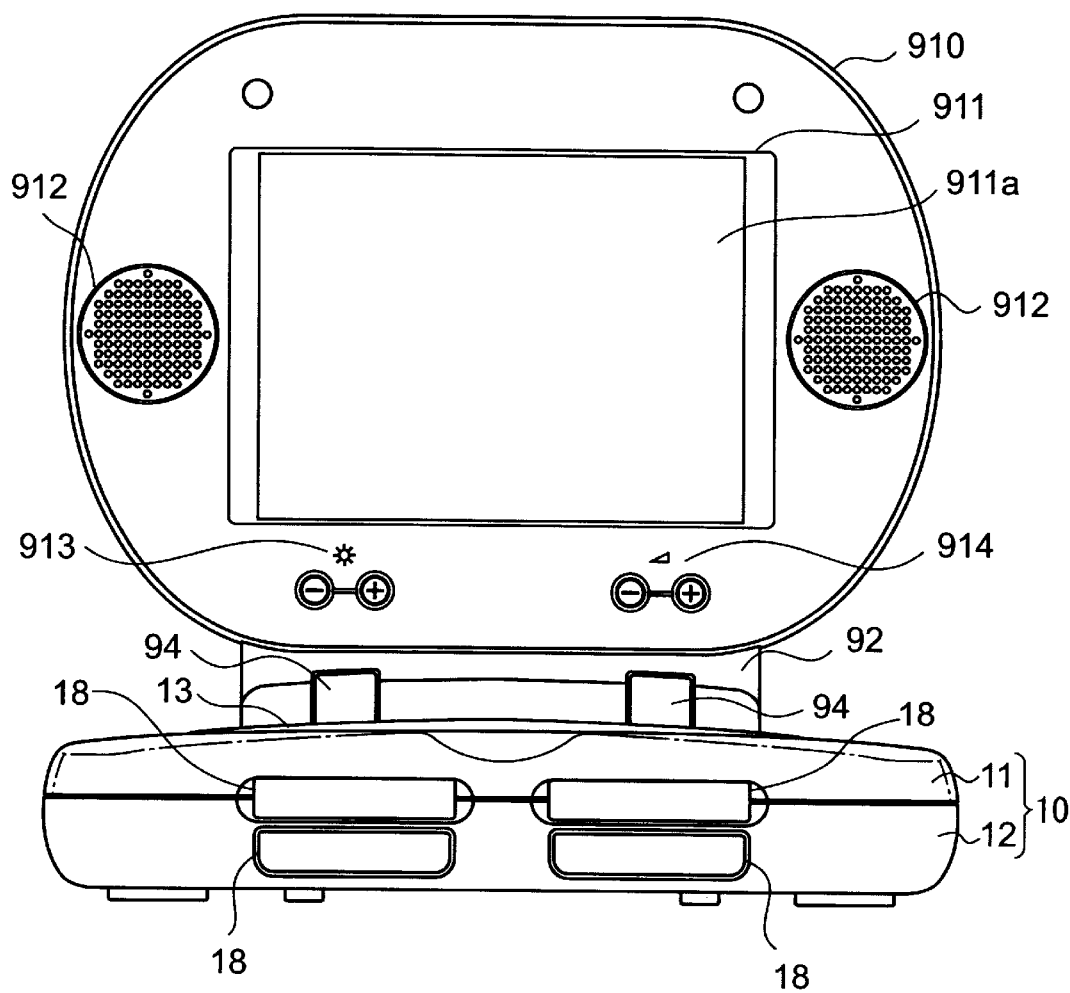
FIG. 27 is a front view of the entertainment apparatus with a monitor device raised according to the second embodiment of the present invention.
Figure 28:
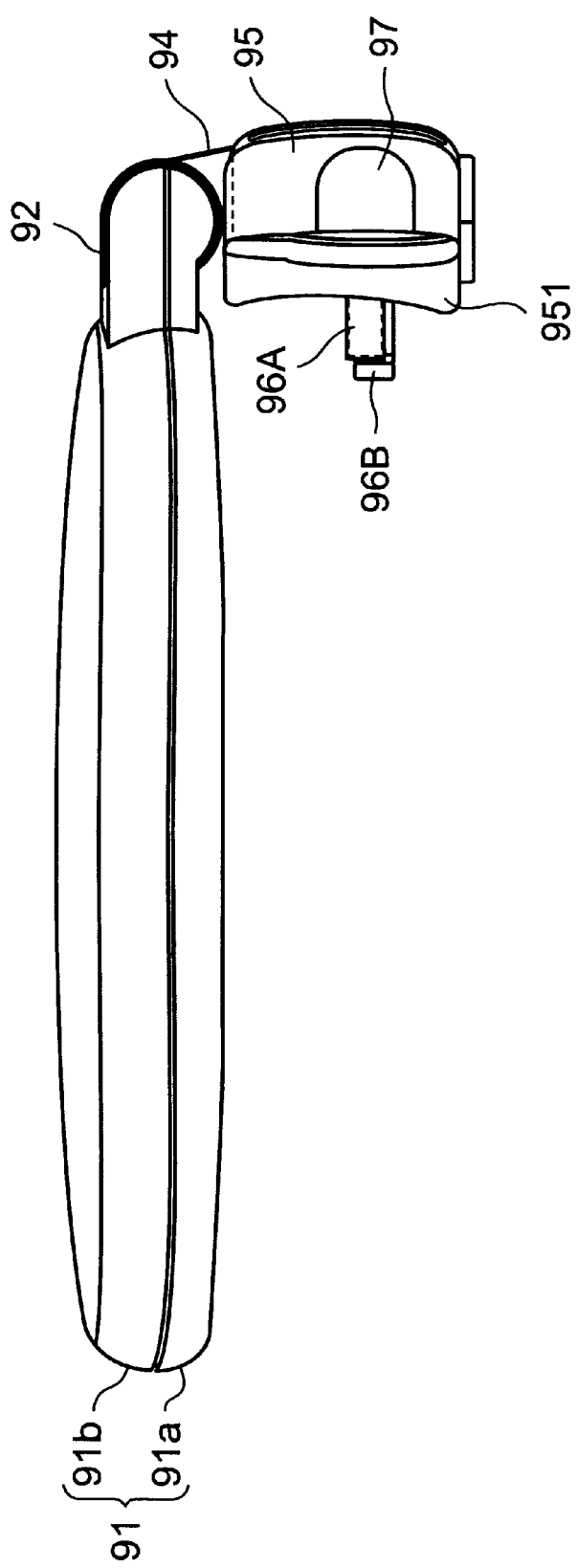
FIG. 28 is a side view of the monitor device used in the entertainment apparatus according to the second embodiment of the present invention.

The display device 911 basically has the same structure as that of the first embodiment with the exception of size. The display device 911 has a display surface 911a provided on the surface facing to the top surface of the lid portion 13, like the first embodiment, when the monitor portion 91 overlaps the lid portion 13. Thus, the display surface 911a is faced toward the front side when the monitor portion 91 is raised against the apparatus body 1 as shown in FIG. 27.

The sound device 912 basically has right and left speakers respectively for right and left channels, like the first embodiment. A circuit for driving the speakers, which is not shown, is disposed in the aforementioned inner space 915 of the panel portion 910.

Figure 24:
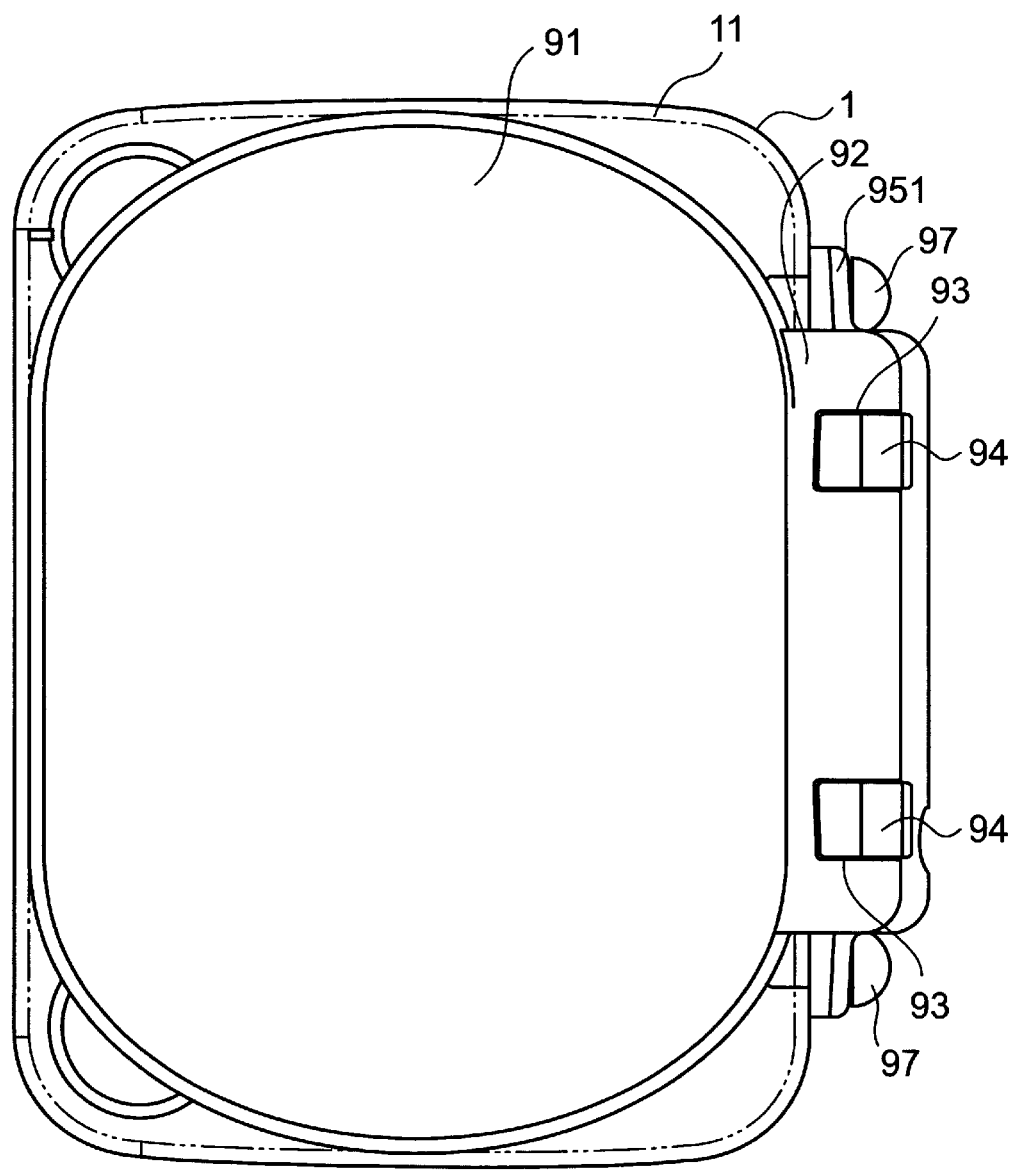
FIG. 24 is a plan view of an entertainment apparatus according to the second embodiment of the present invention.
Figure 29:
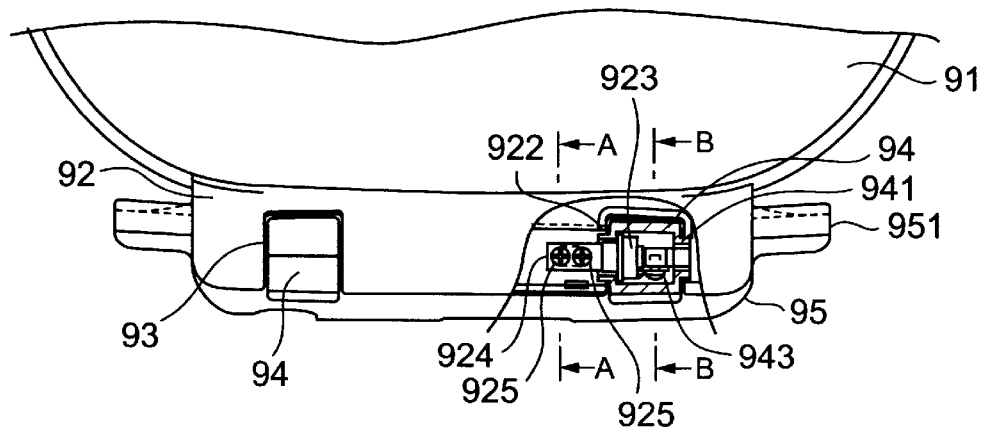
FIG. 29 is a partial cutaway top view illustrating a structure of a connection mechanism part for a monitor portion and a fixing portion of the monitor device according to the second embodiment.
Figure 30:
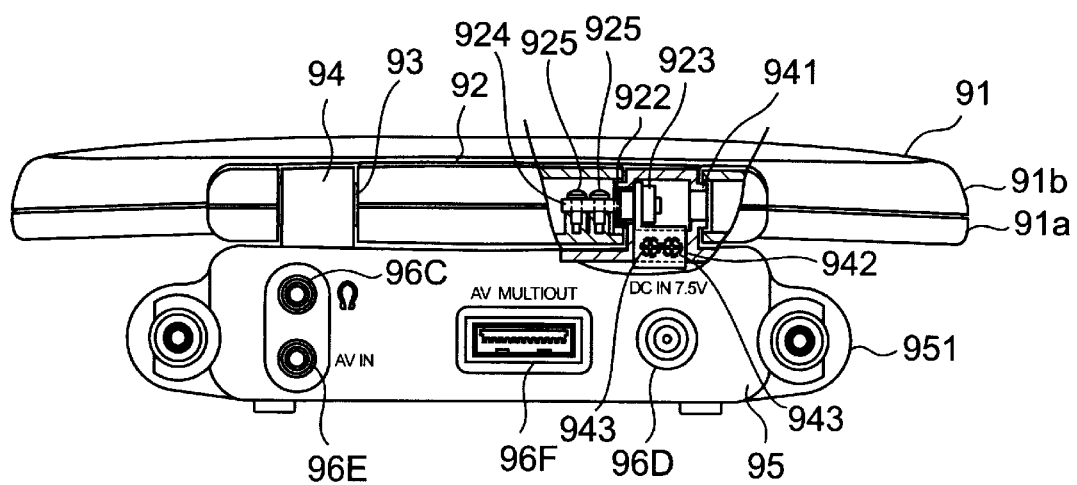
FIG. 30 is a partial cutaway rear elevation view illustrating a structure of a connection mechanism part for the monitor portion and the fixing portion of the monitor device according to the second embodiment.

In the present embodiment, the base portion 92 is integrally provided with the panel portion 910. As shown in FIGS. 24, 29 and 30, at the basal end of the base portion 92, two notches 93 are provided. In these notches 93, accommodation portion 922 is provided for accommodating a projection 941 shown in FIGS. 34A and 34B.

Figure 31:
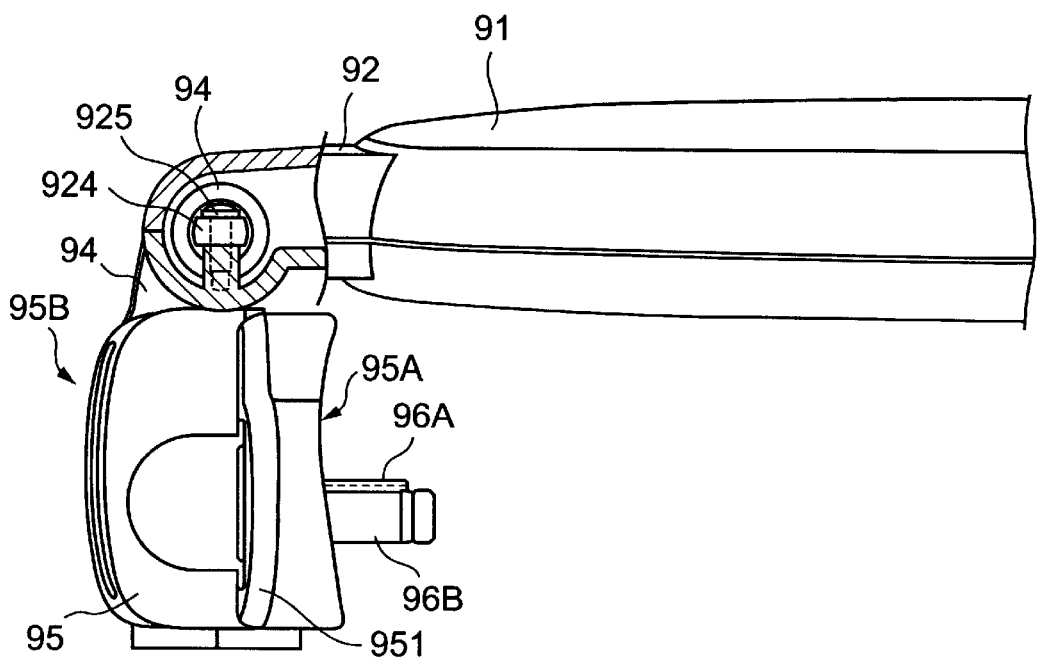
FIG. 31 is a sectional view taken substantially along the lines A—A of FIG. 29, illustrating a structure of connection mechanism part for the monitor portion and the fixing portion of the monitor device according to the second embodiment.
Figure 32:
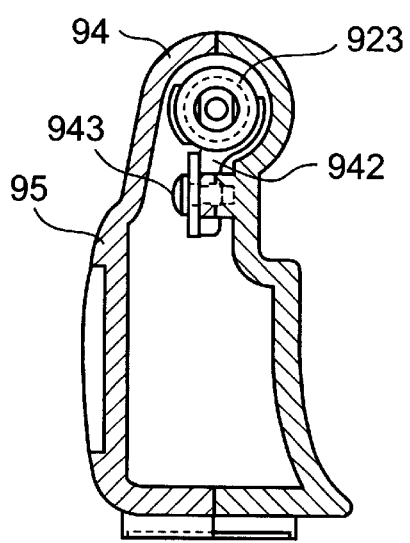
FIG. 32 is a sectional view taken substantially along the lines B—B of FIG. 29, illustrating a structure of connection mechanism part for the monitor portion and the fixing portion of the monitor device according to the second embodiment.

The fixing portion 95 is connected to the aforementioned monitor portion 91. Therefore, the fixing portion 95, as shown in FIGS. 29, 30, 31 and 31, has a mechanical portion for rotatably supporting the monitor portion 91. The mechanical portion comprises a bearing 94 and a spindle 923 rotatably supported by the bearing. In the bearing 94, a fixing member 942 is fixed by a screw 943. This fixing member 942 rotatably supports the spindle 923. One end of the spindle 923 is connected to a supporting member 924. The supporting member 924 is fixed to the base portion 92 by a screw 925. The monitor portion 91 has a configuration comprising a lower member 91a and an upper member 91b. Thereby, the spindle 923 is rotatably connected to the fixing member 942 at the lower member 91a, and the supporting member 924 is fixed the base portion 92 by the screw 925. Then, the upper member 91b is fixed to the lower member 91a.

Figure 23:
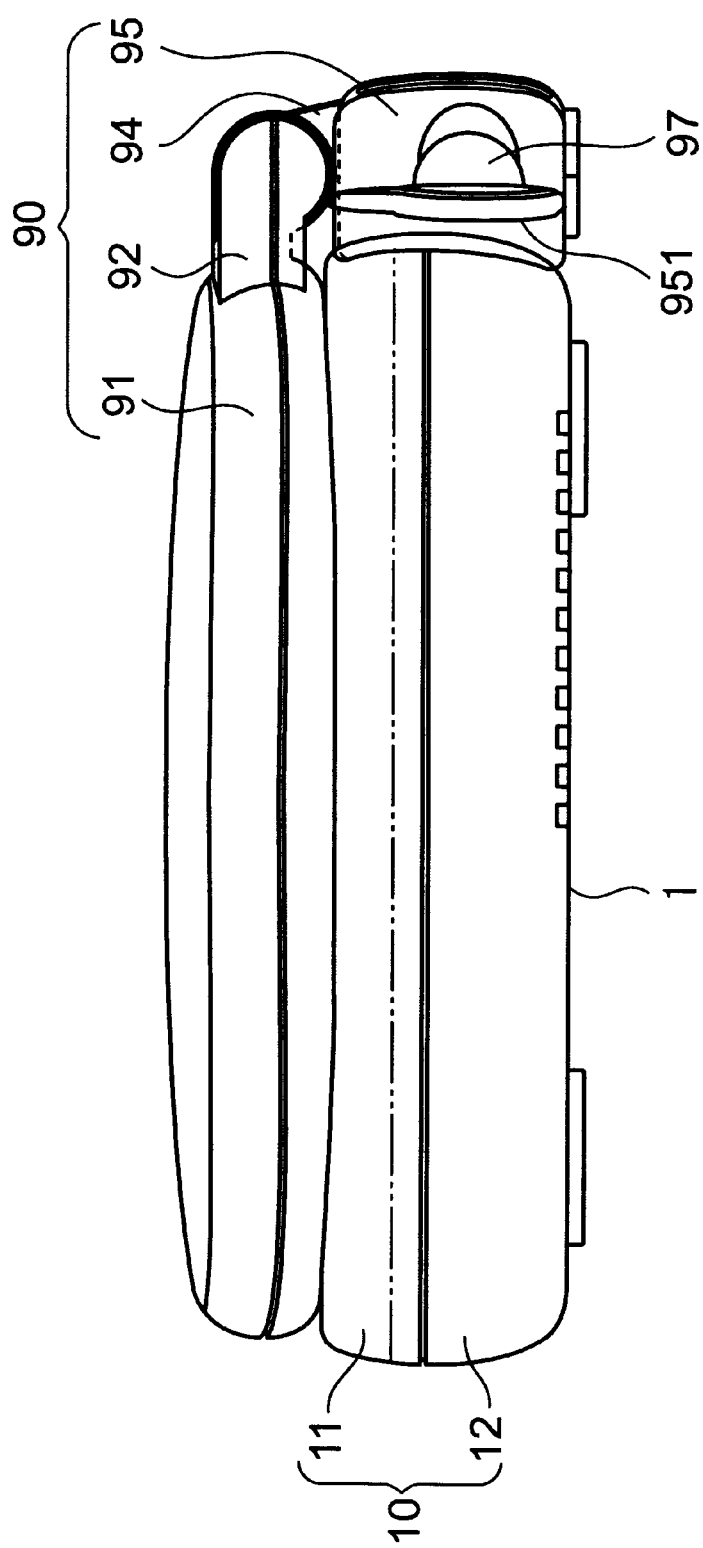
FIG. 23 is a side view of an entertainment apparatus according to the second embodiment of the present invention.
Figure 25:
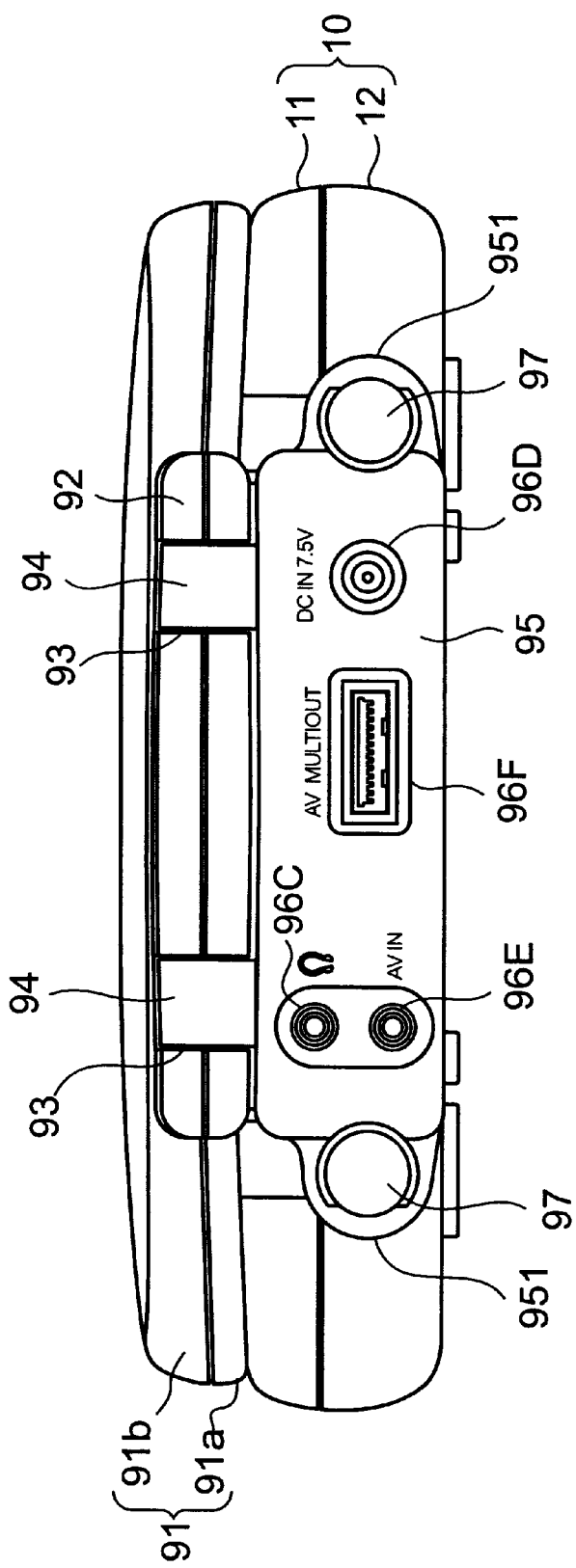
FIG. 25 is a rear view of an entertainment apparatus according to the second embodiment of the present invention.
Figure 26:
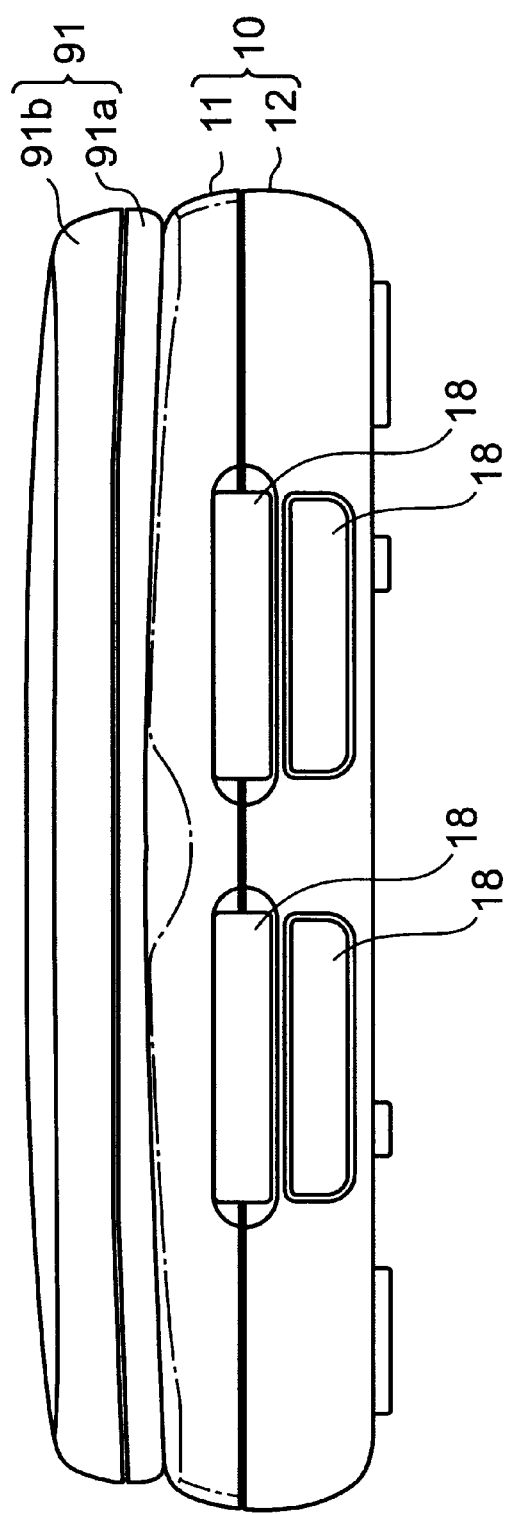
FIG. 26 is a front view of an entertainment apparatus according to the second embodiment of the present invention.

On the other hand, the fixing portion is attached to the rear surface of the casing 10 of the apparatus body 1 as shown in FIGS. 23, 25 and 35B. The fixing portion 95 has functions of supplying power to the monitor portion 91 and sending video and sound signals to the monitor portion 91 other than that of fixing the monitor portion 91 to the casing 10 as described above.

Power supply and transmission of video and sound signals are carried out by a group of lead wires such as a flat cable. Two of the group of lead wires are connected to a power supply plug jack 86 on the substrate 85 to be used for supplying direct current power. The other signal lines of the group of the lead wires are used to transmit the video and sound signals. Further, two of them are returned back through the volume adjusting operation portion 914 provided on the monitor portion 91, so as to be connected to a headphone jack (which may be referred to as "earphone jack") 96C (refer to FIG. 20). It may be also arranged that connection priority be given to the headphone, when the headphone plug is inserted into the headphone jack, thereby to turn off reproduction by the sound device 912.

Figure 34A:
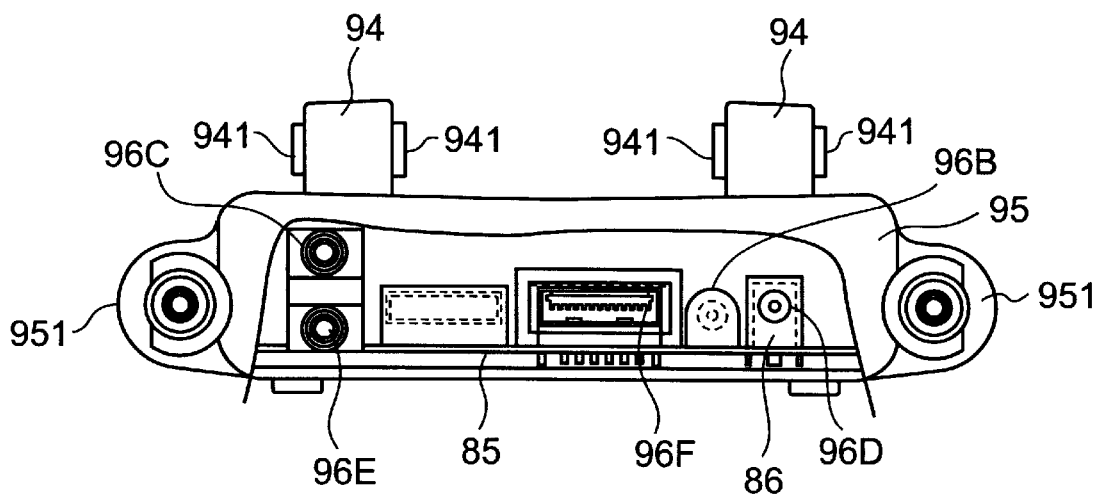
FIG. 34A is a partial cutaway view illustrating an internal structure of the fixing portion.
Figure 34B:
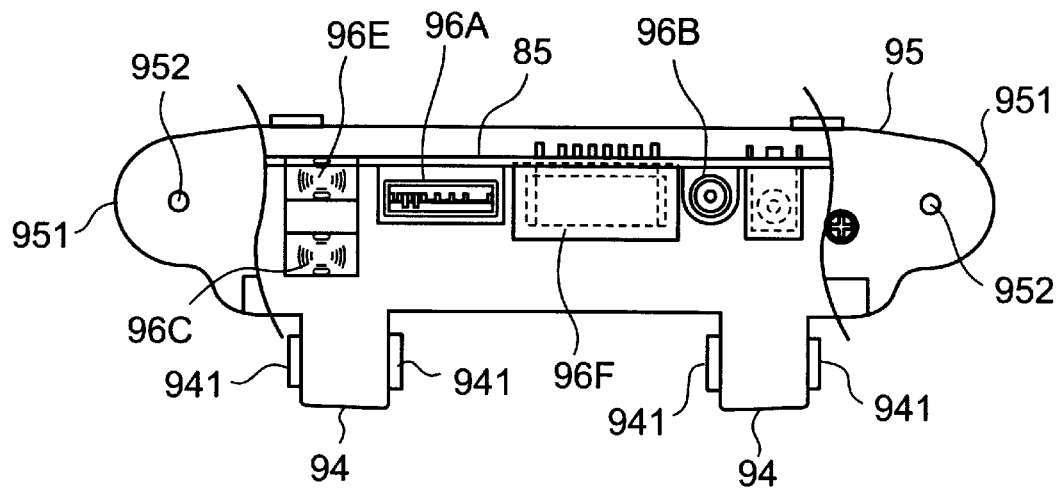
FIG. 34B is a partial cutaway view illustrating an internal structure of the fixing portion.

As shown in FIGS. 34A, 34B and 35B, on the substrate 85 are provided a video-sound input terminal 96A to which the video-sound output terminal (see FIG. 4) of the apparatus body is connected and video and sound signals are inputted, a power supply connector 96B to which the power supply connector (see FIG. 1) of the apparatus body 1 is connected, a power supply connector 96D to which the power plug from outside is connected, a image input terminal 96E for receiving image input from outside to the monitor portion 91, a video-sound output terminal 96F for outputting video and sound signals to outside. In addition, a circuit (not shown) is provided thereon for connecting between these terminals.

Flanges 951 are provided at the both ends of the fixing portion 95 (refer to FIGS. 25, 34A and 34B). The flanges have through-holes 952 provided for inserting bolts 97 (refer to FIG. 21). The fixing portion 95 is fixed to the casing 10 by inserting the bolts 97 into the through-holes 952 and screwing the tips of the inserted bolts 97 on the screw holes 125 of the casing 10.

Figure 33:
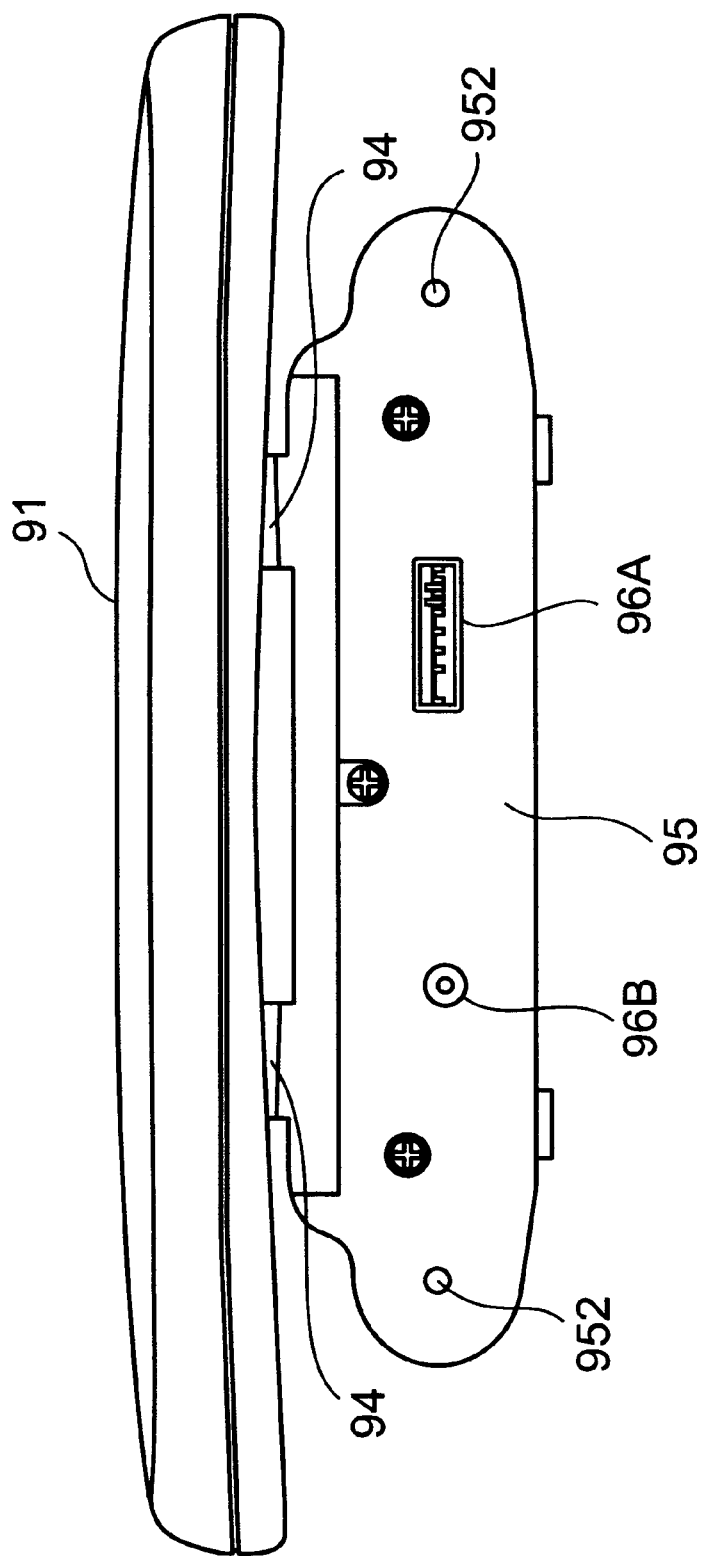
FIG. 33 is an elevational view illustrating a monitor portion constituting the monitor device.

An video-sound input terminal 96A, which is used as a signal input terminal, and a power supply connector 96B are disposed on the surface 95A of the fixing portion 95, which faces to the casing (refer to FIGS. 31, 33 and 35B). The video-sound input terminal 96A is fitted into the opening 19A of the apparatus body 1 and connected with the video-sound output terminal 45 in fixing the fixing portion 95 to the casing 10. The power supply connector 96B is fitted into the opening 19B of the apparatus body 1 and connected with the power supply connector 44 as well. Accordingly, after receiving the image-sound signals outputted from the apparatus body 1, the image and sound can be displayed on and outputted to the monitor portion 91. Further, a common power supply can drive the monitor portion 91 and the apparatus body 1. It may be also arranged that the monitor portion 91 can be driven by the different power supply from that of the apparatus body 1.

On the surface 95B of the fixing portion 95, which does not face to the casing, are disposed a headphone jack 96C, a power supply connector 96D, an image input terminal 96E, and a video-sound output terminal 96F as shown in FIGS. 25, 30 and 35B. The headphone jack 96C is supplied via a wiring not shown with sound signals branched through an inner circuit 98 from the aforementioned video-sound input terminal 96A (refer to FIG. 19). Thus, connecting the headphone plug to the headphone jack 95C allows a user to enjoy listening to the sound by means of the headphone. The connector 96D, as well as the connector provided on the apparatus body 1, can be connected to the corresponding power supply connector and supplied with power from outside. The image input terminal 96E is connected with an image terminal 250 and used for receiving an image and displaying the image on the monitor 91. The video-sound output terminal 96F is connected with an external connector 200 and used for outputting to outside the video and sound signals generated in the apparatus body 1.

The entertainment apparatus according to the above embodiment as mentioned, can serve to play games and to reproduce video and sound only by the apparatus itself when the monitor device 90 is attached to the apparatus body 1. In addition, the monitor portion 91 can open and close like a clamshell structure against the apparatus body 1 in the monitor device 90. For this reason, the monitor portion 91 can open when needed, whereas it can close when no needed, so that its portability is improved.

The monitor device 90 is attached to the casing 10 by means of bolts at the fixing portion 95, so that it is easily attached and detached.

Further, according to the present embodiment, video and sound signals can be outputted to an external apparatus.

The present invention is not limited to the aforementioned embodiments and includes other constitutions for achieving the objects of the present invention as well as its modification described as follows.

For example, the monitor device 90 may only have the display device although it has both of the display and sound devices in the foregoing embodiment. In this case, it may be arranged for performing sound reproduction, for example, by a headphone via a headphone jack.

In the foregoing embodiment, the video-sound signals outputted from the apparatus body 1 are used only in the monitor device 90 for displaying. However, the present invention is not limited thereto. For example, an video-sound output terminal may be provided on the fixing portion 95, and output to an externally connected television set or the like can be performed.

Further, in the foregoing embodiment, the image-sound signals are received at the fixing portion 95 from the apparatus body 1 via the connector, and sent to the monitor portion 91 using the flat cable. However, the present invention is not limited thereto. For instance, it may be constituted that the video-sound signals are directly received by the monitor portion from the apparatus body without the fixing portion 95. Examples thereof include receiving information by radio. For example, infrared communication ports may be provided on both the apparatus body 1 and the monitor portion 91 so as to transmit the video-sound signals by means of infrared rays. In addition to the infrared rays, the video-sound signals are transmitted by means of short-range radio communication using a radio wave such as microwave.

Moreover, as shown in FIG. 22A, the aforementioned embodiment shows the different height in the location between the power supply connectors 96D and 96B. However, the present invention is not limited thereto. The location of the power supply connector 96D can be set as high as that of 96B.

As described above, the entertainment apparatus of the present invention can display video and reproduce sound by itself or by connecting to a television set.

What is claimed is:

1. An entertainment apparatus for generating and outputting video signals including:
   an apparatus body for generating and outputting video signals; and
   a monitor device connected to said apparatus body for displaying images based on the video signals outputted from said apparatus body,
   wherein:
      the apparatus body includes:
         a signal generating portion for reading out information recorded on a record medium loaded to generate and output the video signals;
         a signal output terminal for outputting outside the video signals generated in said signal generating portion; and
         a casing for accommodating the above, and
      the monitor device comprises:
         a monitor portion having a display device for displaying images;
         a fixing portion for connecting and fixing said monitor portion to said casing; and
         a signal input terminal, which is connected to said signal output terminal when said monitor device is connected and fixed to said casing, for receiving signals from said signal output terminal,
         said monitor portion and said fixing portion being rotatably connected with each other;
         wherein said monitor device has a signal output terminal for outputting to outside the video signal inputted to the input terminal.

2. An entertainment apparatus for generating and outputting sound and video signals including:
   an apparatus body for generating and outputting sound and video signals; and
   a monitor device connected to said apparatus body for outputting sound and displaying images based on the sound and video signals outputted from said apparatus body,
   wherein:
      the apparatus body includes:
         a signal generating portion for reading out information recorded on a record medium loaded to generate and output the sound and video signals;
         a signal output terminal for outputting outside the sound and video signals generated in said signal generating portion; and
         a casing for accommodating the above, and
      the monitor device comprises:
         a monitor portion having a display device for displaying images and a sound device for outputting sound;
         a fixing portion for connecting and fixing said monitor portion to said casing; and
         a signal input terminal, which is connected to said signal output terminal when said monitor device is connected and fixed to said casing, for receiving signals from said signal output terminal, and
         said monitor portion and said fixing portion being rotatably connected with each other;
         wherein said monitor device has a signal output terminal for outputting to outside the video signal inputted to the input terminal.

3. The entertainment apparatus according to claim 2, wherein:
   said casing is provided with a container portion on a topside thereof for loading an optical disk and a lid portion capable of opening and closing for covering said container portion; and
   said monitor portion is able to hold the following positions: the monitor portion overlaps the lid portion and the display device faces the lid portion; the monitor portion is raised from the lid portion and keeps the display device visible from the front of the casing, further said monitor portion being at least rotatable between the positions.

4. A monitor device, connected to an apparatus body of an entertainment apparatus, for displaying images by video signals outputted from said apparatus, comprising:
   a monitor potion having a display device for displaying images;
   a fixing portion for connecting and fixing said monitor potion to said apparatus body; and a signal input terminal, which is connected to a signal output terminal of said apparatus body when said monitor device is connected and fixed to said apparatus body, for receiving signals from said signal output terminal, said monitor portion and said fixing portion being rotatably connected with each other;

wherein said monitor device further has a signal output terminal for outputting to outside the video signal inputted to the input terminal.

5. A monitor device, connected to an apparatus body of an entertainment apparatus, for displaying images by video signals outputted from said apparatus and for outputting sound, wherein said monitor device comprises:
   a monitor portion having a display device for displaying images and a sound device for outputting sound;
   a fixing portion for connecting and fixing said monitor portion to said casing; and
   a signal input terminal, which is connected to said signal output terminal of said apparatus body when said monitor device is connected and fixed to said casing, for receiving signals from said signal output terminal, and
   said monitor portion and said fixing portion are rotatably connected with each other;
   wherein said monitor device further has a signal output terminal for outputting to outside the sound and video signals inputted to the input terminal.

6. The monitor device according to claim 5,
   wherein said monitor device further has an image input terminal for receiving image input from outside.

7. A monitor device, connected to said apparatus body of an entertainment apparatus, for displaying images by video signals outputted from an apparatus body, including:
   a monitor potion having a display device for displaying images;
   a fixing portion for connecting and fixing said monitor potion to said apparatus body;
   a signal input terminal for receiving signals from said apparatus body when said monitor device is connected and fixed to said apparatus body; and
   a power connector for receiving power supply from the outside, said monitor portion and said fixing portion being rotatably connected with each other;
   wherein said fixing portion has a headphone jack,
   said signal input terminal is for inputting video and sound signals from said apparatus body; and
   said headphone jack outputs sound signals inputted via said signal input terminal.

8. The monitor device according to claim 7, wherein said monitor portion is connected to said apparatus body and has said display device on a surface visible from the apparatus body.

9. The monitor device according to claim 8, wherein said monitor portion includes a panel portion, on which said display device is disposed, and a base portion for connecting and fixing said panel portion to the fixing portion.

10. The monitor device according to claim 9, wherein said monitor portion includes a stopper on the outside of said display device of said panel portion.

11. The monitor device according to claim 10, wherein said monitor portion includes a display device luminance adjusting operation portion on said panel portion.

12. A monitor device, connected to said apparatus body of an entertainment apparatus, for displaying images by video signals outputted from an apparatus body, including:
   a monitor potion having a display device for displaying images;
   a fixing portion for connecting and fixing said monitor potion to said apparatus body;
   a signal input terminal for receiving signals from said apparatus body when said monitor device is connected and fixed to said apparatus body; and a power connector for receiving power supply from the outside, said monitor portion and said fixing portion being rotatably connected with each other;
   wherein said fixing portion further has a image input terminal for receiving image input from outside, and
   wherein said fixing portion further has a signal output terminal for outputting to outside the video and sound signals inputted to the input terminal.

13. A monitor device, connected to said apparatus body of an entertainment apparatus, for displaying images by video signals outputted from an apparatus body, including:
   a monitor potion having a display device for displaying images;
   a fixing portion for connecting and fixing said monitor potion to said apparatus body;
   a signal input terminal for receiving signals from said apparatus body when said monitor device is connected and fixed to said apparatus body; and a power connector for receiving power supply from the outside, said monitor portion and said fixing portion being rotatably connected with each other;
   wherein said power connector for supplying power is disposed on the surface of said fixing portion, the surface facing to said apparatus body upon connection to said apparatus body.

14. The monitor device according to claim 13 wherein a power connector for receiving power from outside is disposed on the surface of said fixing portion, the surface not facing to said apparatus body upon connection to said apparatus body.

15. The monitor device according to claim 14, wherein said signal input terminal is disposed on the surface of said fixing portion, the surface facing to said apparatus body upon connection to said apparatus body.

16. A monitor device, connected to an apparatus body of an entertainment apparatus, for displaying images by video signals outputted from said apparatus, comprising:
   a monitor potion having a display device for displaying images;
   a fixing portion for connecting and fixing said monitor potion to said apparatus body; and
   a signal input terminal, which is connected to a signal output terminal of said apparatus body when said monitor device is connected and fixed to said apparatus body, for receiving signals from said signal output terminal,
   said monitor portion and said fixing portion being rotatably connected with each other;
   wherein said fixing portion further has an image input terminal for receiving image input from outside.

* * * * *